United States Patent
Paz et al.

(10) Patent No.: US 12,052,201 B2
(45) Date of Patent: Jul. 30, 2024

(54) FREQUENCY FIRST PER LAYER CODE BLOCK MAPPING

(71) Applicant: QUALCOMM Incorporated, San Diego, CA (US)

(72) Inventors: Daniel Paz, Geva Carmel (IL); Michael Levitsky, Rehovot (IL); Jacob Pick, Beit Zayit (IL); Assaf Touboul, Netanya (IL)

(73) Assignee: QUALCOMM Incorporated, San Diego, CA (US)

( * ) Notice: Subject to any disclaimer, the term of this patent is extended or adjusted under 35 U.S.C. 154(b) by 332 days.

(21) Appl. No.: 17/453,159

(22) Filed: Nov. 1, 2021

(65) Prior Publication Data

US 2023/0139174 A1 May 4, 2023

(51) Int. Cl.
*H04L 5/00* (2006.01)
*H04W 72/23* (2023.01)

(52) U.S. Cl.
CPC ............ *H04L 5/006* (2013.01); *H04L 5/0064* (2013.01); *H04L 5/0073* (2013.01); *H04W 72/23* (2023.01)

(58) Field of Classification Search
None
See application file for complete search history.

(56) References Cited

U.S. PATENT DOCUMENTS

| | | | |
|---|---|---|---|
| 9,596,017 B1 * | 3/2017 | Mayrench | H04L 5/0028 |
| 11,223,441 B1 * | 1/2022 | Kim | H04J 11/004 |
| 2009/0313516 A1 * | 12/2009 | Shin | H04L 1/1806 |
| | | | 714/748 |
| 2010/0208680 A1 * | 8/2010 | Nam | H04L 5/0023 |
| | | | 370/329 |

(Continued)

FOREIGN PATENT DOCUMENTS

| | | | | |
|---|---|---|---|---|
| CN | 107820685 A | * | 3/2018 | H04L 1/1861 |
| CN | 108418657 A | * | 8/2018 | H04L 1/0038 |

(Continued)

OTHER PUBLICATIONS

International Search Report and Written Opinion dated Dec. 23, 2022 from corresponding PCT Application No. PCT/US2022/077569.

(Continued)

*Primary Examiner* — Andrew C Oh
(74) *Attorney, Agent, or Firm* — QUALCOMM Incorporated

(57) ABSTRACT

Aspects are provided which allow for a base station to transmit code blocks according to a frequency first per layer (FFPL) mapping, and for a UE to decode received code blocks according to the FFPL mapping. The base station maps a plurality of code blocks to multiple layers, where each of the code blocks is mapped to a plurality of resource elements initially by frequency and subsequently by time on only a single layer of the multiple layers. The base station then transmits data including the code blocks to a UE.

(Continued)

Afterwards, the UE receives the data including the mapped code blocks in multiple layers from the base station, and the UE decodes the code blocks based on the mapping. Thus, improvements in link efficiency, reliability, and reduced power consumption compared to frequency first (FF) mapping approaches may be achieved.

27 Claims, 16 Drawing Sheets

(56) References Cited

U.S. PATENT DOCUMENTS

| | | | | |
|---|---|---|---|---|
| 2010/0239035 | A1* | 9/2010 | Blankenship | H04L 1/0656 375/260 |
| 2011/0080975 | A1 | 4/2011 | Takashi et al. | |
| 2011/0280222 | A1* | 11/2011 | Nam | H04L 1/0073 370/335 |
| 2017/0168784 | A1* | 6/2017 | Hwang | G06F 8/34 |
| 2018/0132269 | A1* | 5/2018 | Wang | H04L 5/0051 |
| 2018/0159707 | A1* | 6/2018 | Onggosanusi | H04L 1/0061 |
| 2018/0331879 | A1* | 11/2018 | Yang | H04L 27/362 |
| 2021/0044383 | A1* | 2/2021 | Sarkis | H04W 72/23 |
| 2023/0047824 | A1* | 2/2023 | Paz | H04W 72/54 |

FOREIGN PATENT DOCUMENTS

| | | | | |
|---|---|---|---|---|
| CN | 110495114 | A * | 11/2019 | ........... H04L 1/1607 |
| CN | 115052346 | A * | 9/2022 | |
| EP | 1392017 | A1 * | 2/2004 | ........... H03M 13/25 |
| TW | 202017334 | A * | 5/2020 | ........... H04L 1/1861 |
| VN | 10037244 | B * | 10/2023 | ............. H04L 1/00 |
| WO | WO-2010098532 | A1 * | 9/2010 | ........... H04B 7/0426 |
| WO | WO-2010127622 | A2 * | 11/2010 | ........... H04L 1/0071 |
| WO | WO-2013167967 | A2 * | 11/2013 | ........... H04L 5/0007 |
| WO | WO-2016070657 | A1 * | 5/2016 | ............. H04B 7/204 |
| WO | WO-2018129017 | A2 * | 7/2018 | ........... H04L 1/0088 |
| WO | WO-2018143740 | A1 * | 8/2018 | ............. H04L 1/00 |
| WO | WO-2018174555 | A1 * | 9/2018 | ............. H04L 1/04 |
| WO | WO-2018202108 | A1 * | 11/2018 | ............. H04L 1/00 |
| WO | WO-2018231626 | A1 * | 12/2018 | ........... H04L 1/0026 |

OTHER PUBLICATIONS

ZTE et al: "Physical Layer Abstraction Method for MMSE-SIC Type Receiver", 3GPP Draft; R1-1608954 Physical Layer Abstraction Method for MMSE-SIC Type Receiver, 3rd Generation Partnership Project (3GPP), Mobile Competence Centre; 650, Route Des Lucioles; F-06921 Sophia-Anti vol. RAN WGI, No. Lisbon, Portugal; Oct. 10, 2016-Oct. 14, 2016, Oct. 9, 2016 (Oct. 9, 2016), XP051149008, Retrieved from the Internet: URL:http://www.3gpp.org/ftp/Meetings_3GPP_SYNC/RANI/Docs/ [retrieved on Oct. 9, 2016].

* cited by examiner

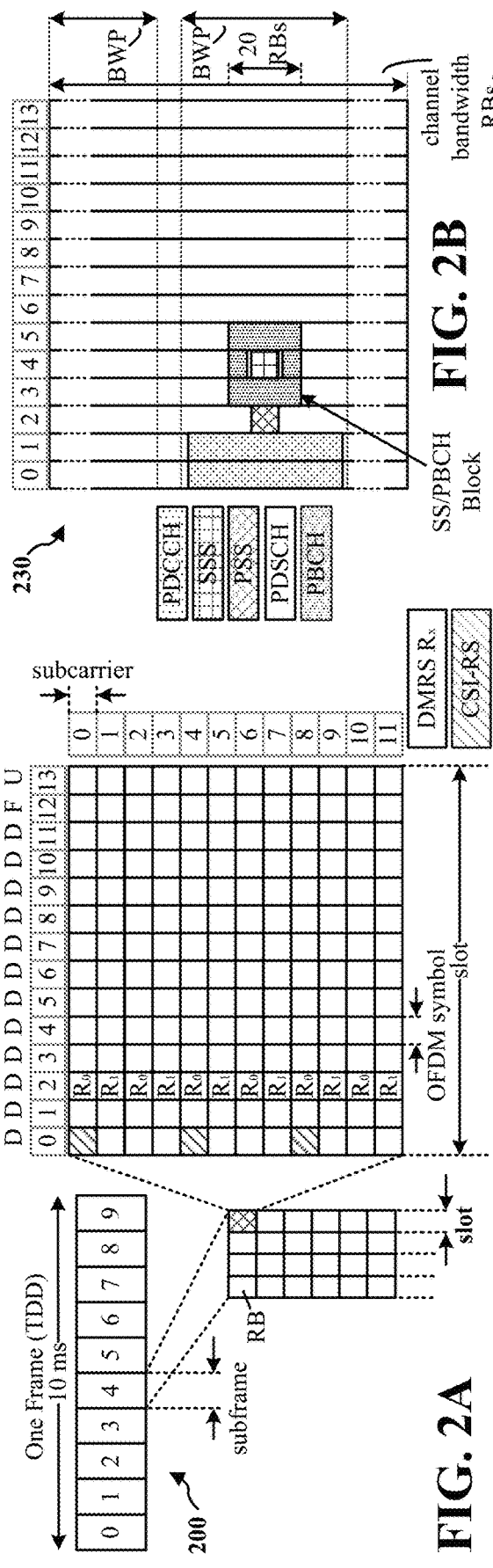
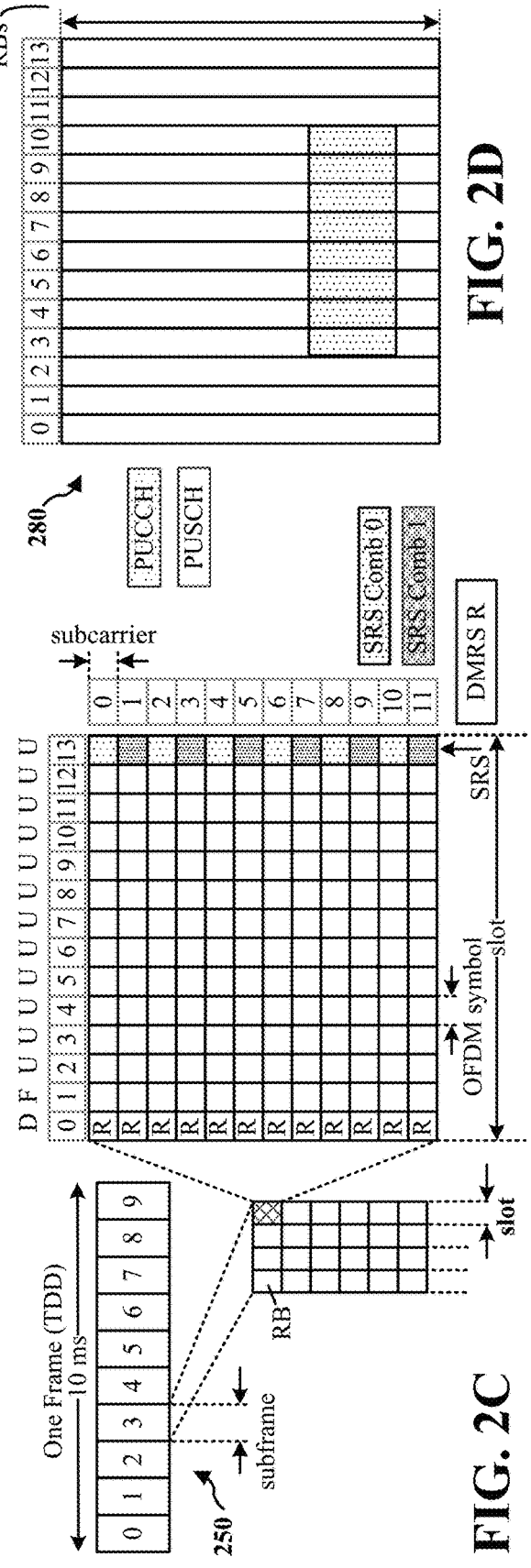
FIG. 2A  FIG. 2B  FIG. 2C  FIG. 2D

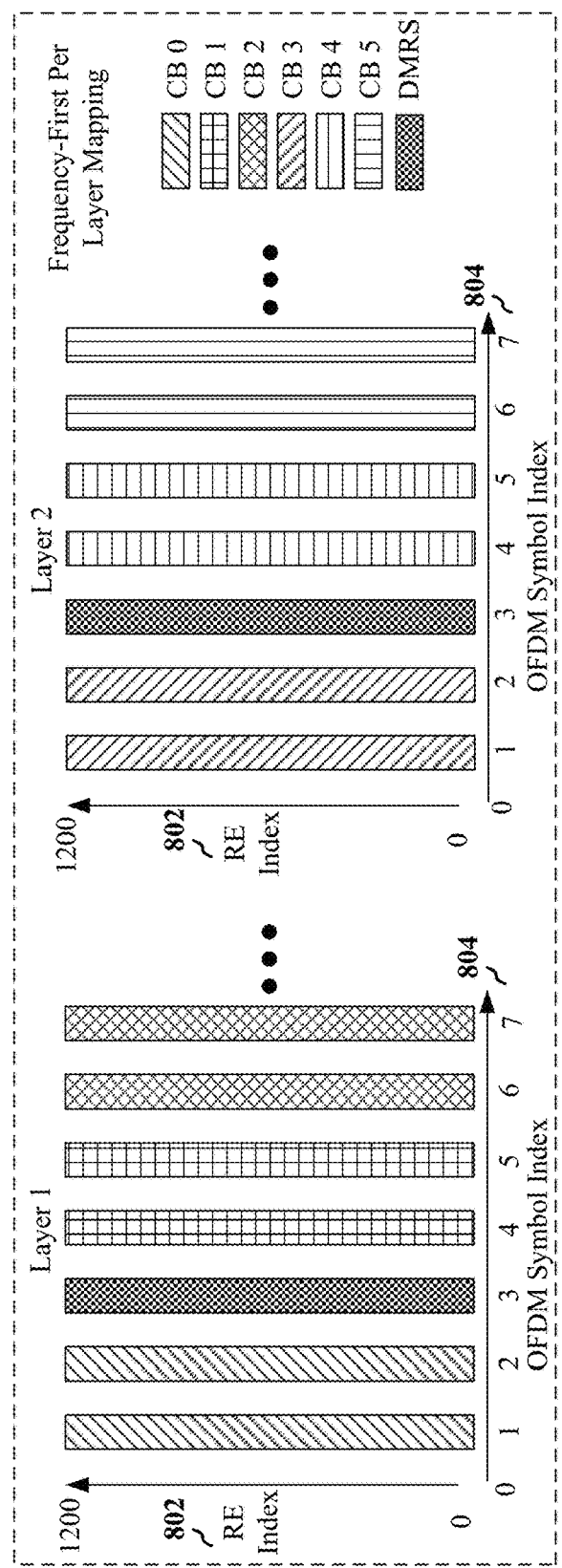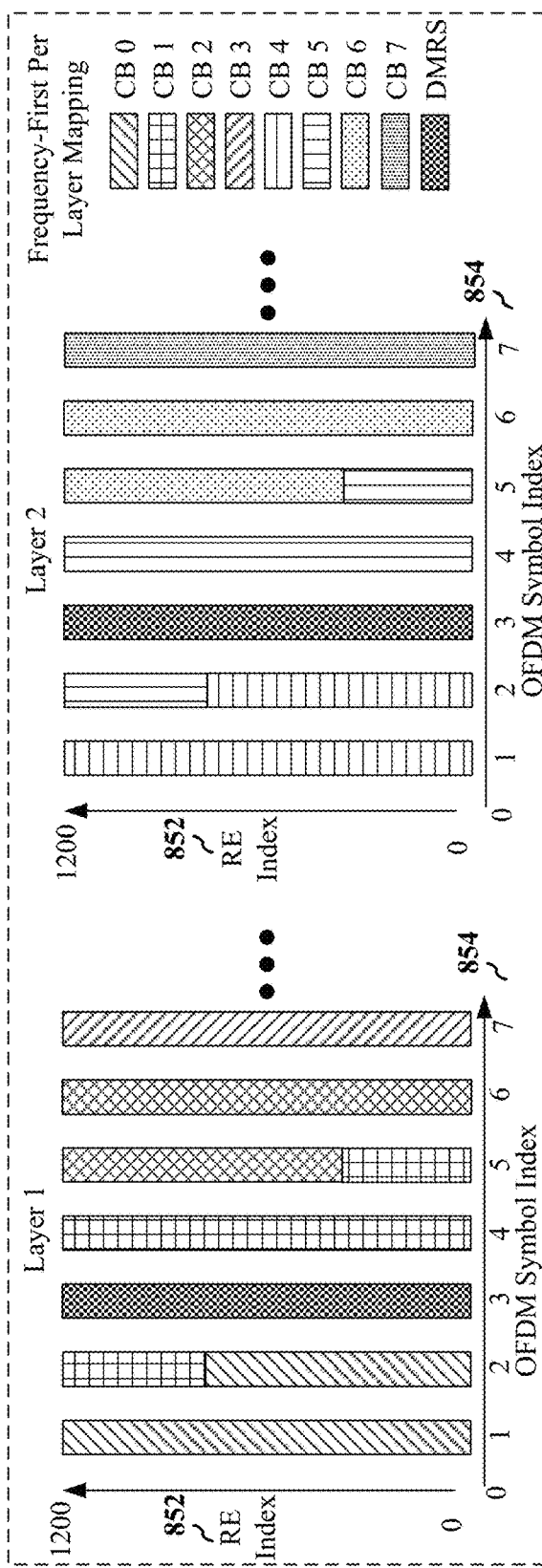
FIG. 8A
FIG. 8B

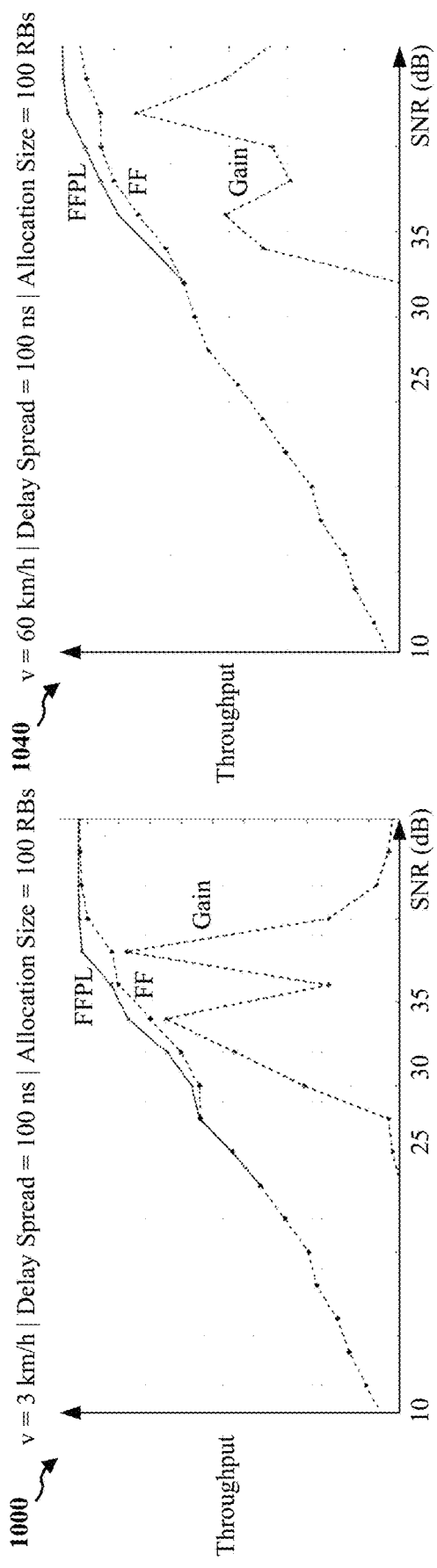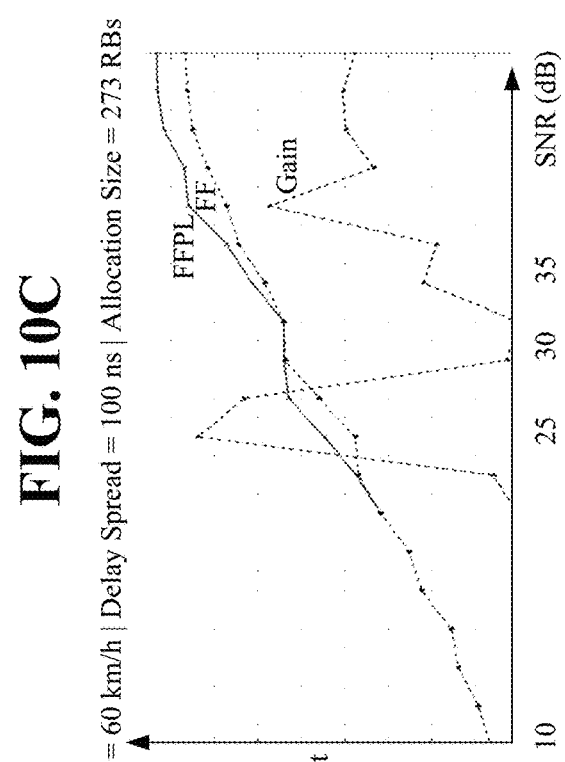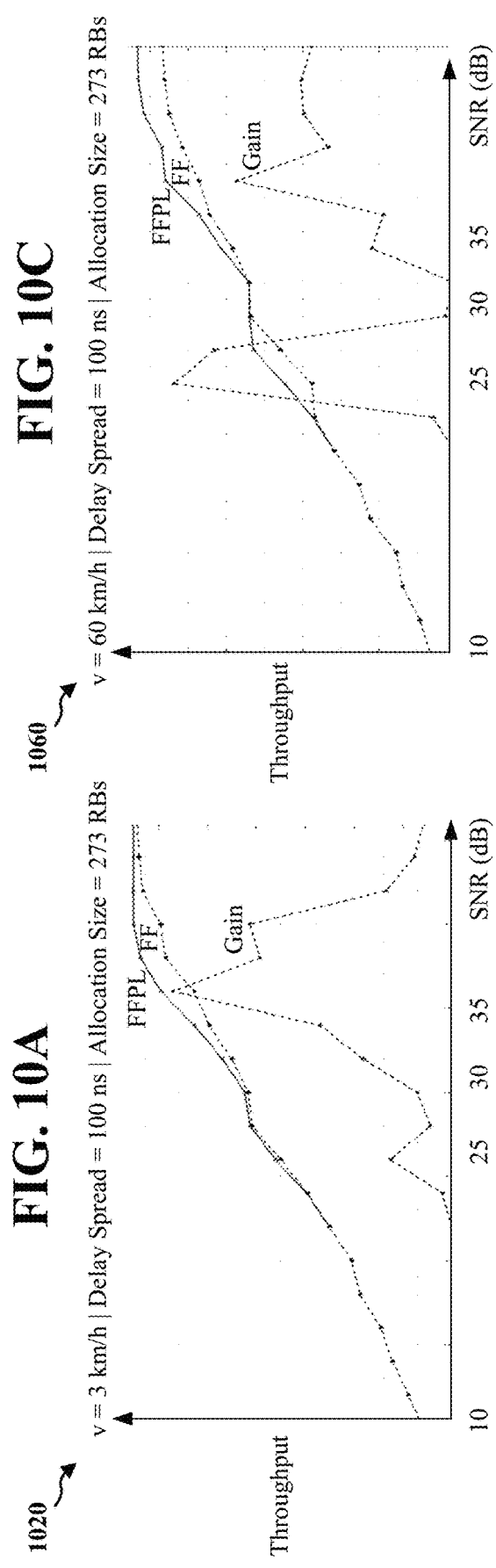
FIG. 10A
FIG. 10B
FIG. 10C
FIG. 10D

FREQUENCY FIRST PER LAYER CODE BLOCK MAPPING

BACKGROUND

Technical Field

The present disclosure generally relates to communication systems, and more particularly, to a wireless communication system between a user equipment (UE) and a base station.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a UE. The UE receives data in multiple layers from a base station, the data including a plurality of code blocks, where each of the code blocks is mapped to a plurality of resource elements initially by frequency and subsequently by time on only a single layer of the multiple layers. The UE decodes the code blocks based on the mapping.

In an aspect of the disclosure, a method, a computer-readable medium, and an apparatus are provided. The apparatus may be a base station. The base station maps a plurality of code blocks to multiple layers, where each of the code blocks is mapped to a plurality of resource elements initially by frequency and subsequently by time on only a single layer of the multiple layers. The base station transmits data including the code blocks to a UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

FIGS. 8A and 8B are diagrams illustrating examples of code blocks mapped in a frequency first per layer manner to resource elements in multiple layers.

FIGS. 10A-10D are diagrams illustrating examples of simulation results showing throughput gains of frequency first per layer mapped code blocks over frequency first mapped code blocks in different scenarios.

DETAILED DESCRIPTION

Figure 1:
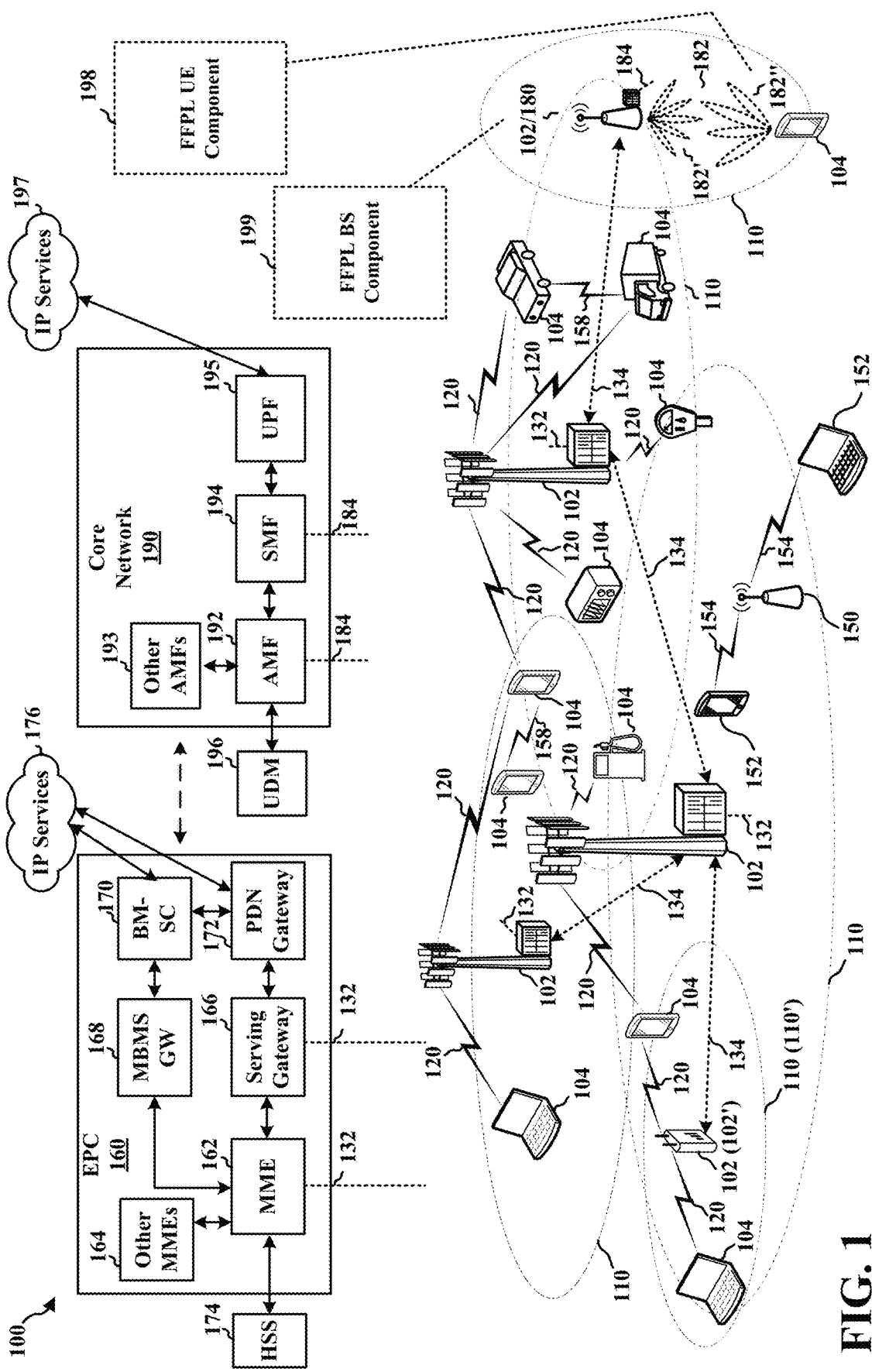
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Generally, when the base station processes downlink data in a physical downlink shared channel (PDSCH), the base station maps code blocks to resource elements (REs) in a frequency first (FF) manner. In FF mapping, the modulated symbols of a code block in each layer are mapped in parallel to contiguous REs along the frequency dimension from a lowest RE index to a highest RE index (or vice-versa), code block after code block. FF mapping may provide frequency diversity in combination with typical interleaving approaches. Additionally, FF mapping may also provide layer (spatial) diversity in the case where the base station and UE undergo multiple-input-multiple-output (MIMO) transmission with multiple layers.

Nevertheless, it would be helpful to allow a different code block mapping strategy than FF mapping in order to further improve at least one of these diversity schemes (e.g., frequency diversity, layer diversity, and other diversity types (e.g., time diversity). For example, code blocks spanning multiple resource blocks in a relatively low channel coherency bandwidth (e.g., with a moderate-to-high delay spread) may benefit from enhanced frequency diversity. Moreover, code blocks spanning multiple layers (having a MIMO rank>1) may benefit from enhanced layer diversity. Yet, as enhancing one diversity scheme may disadvantage another diversity scheme, it would helpful for such other mapping strategy to provide a balance between the diversity schemes.

Accordingly, aspects of the present disclosure describe a frequency first per layer (FFPL) code block mapping scheme which may apply in cases where the UE and base station undergo MIMO communication with a rank>1 (e.g., in cases where code blocks are transmitted and received across multiple layers). FFPL mapping may allow for increased frequency diversity (or time diversity) for each code block over that of FF mapping. Moreover, FFPL mapping may provide a balance between the enhancement to frequency diversity and an expense to layer diversity which may result from FFPL mapping. Furthermore, depending on an allocation scenario (e.g., number of resource blocks or resource elements assigned to each code block), channel characteristics (e.g., speed and delay spread), the rank applied to the code block transmission, and a signal-to-noise ratio (SNR) or modulation and coding scheme (MCS) region for the layers, FFPL mapping may provide improved link efficiency, improved reliability, and reduced power consumption (e.g., fewer decoding iterations) over FF mapping. Additionally, the base station may dynamically indicate whether the UE is to apply FFPL mapping as described in more detail below, or whether to merely apply FF mapping as previously described.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a Packet Switch (PS) Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

Referring again to FIG. 1, in certain aspects, the UE 104 may include a FFPL UE component 198 that is configured to receive data in multiple layers from a base station, the data including a plurality of code blocks, where each of the code blocks is mapped to a plurality of resource elements initially by frequency and subsequently by time on only a single layer of the multiple layers. The FFPL UE component 198 is also configured to decode the code blocks based on the mapping.

Referring again to FIG. 1, in certain aspects, the base station 102, 180 may include a FFPL base station (BS) component 199 that is configured to map a plurality of code blocks to multiple layers, where each of the code blocks is mapped to a plurality of resource elements initially by frequency and subsequently by time on only a single layer of the multiple layers. The FFPL BS component 199 is also configured to transmit data including the code blocks to a UE.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu 0$ to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kilohertz (kHz), where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data, and may additionally be used to carry a buffer status report (BSR), a power headroom report (PHR), and/or UCI.

Figure 3:
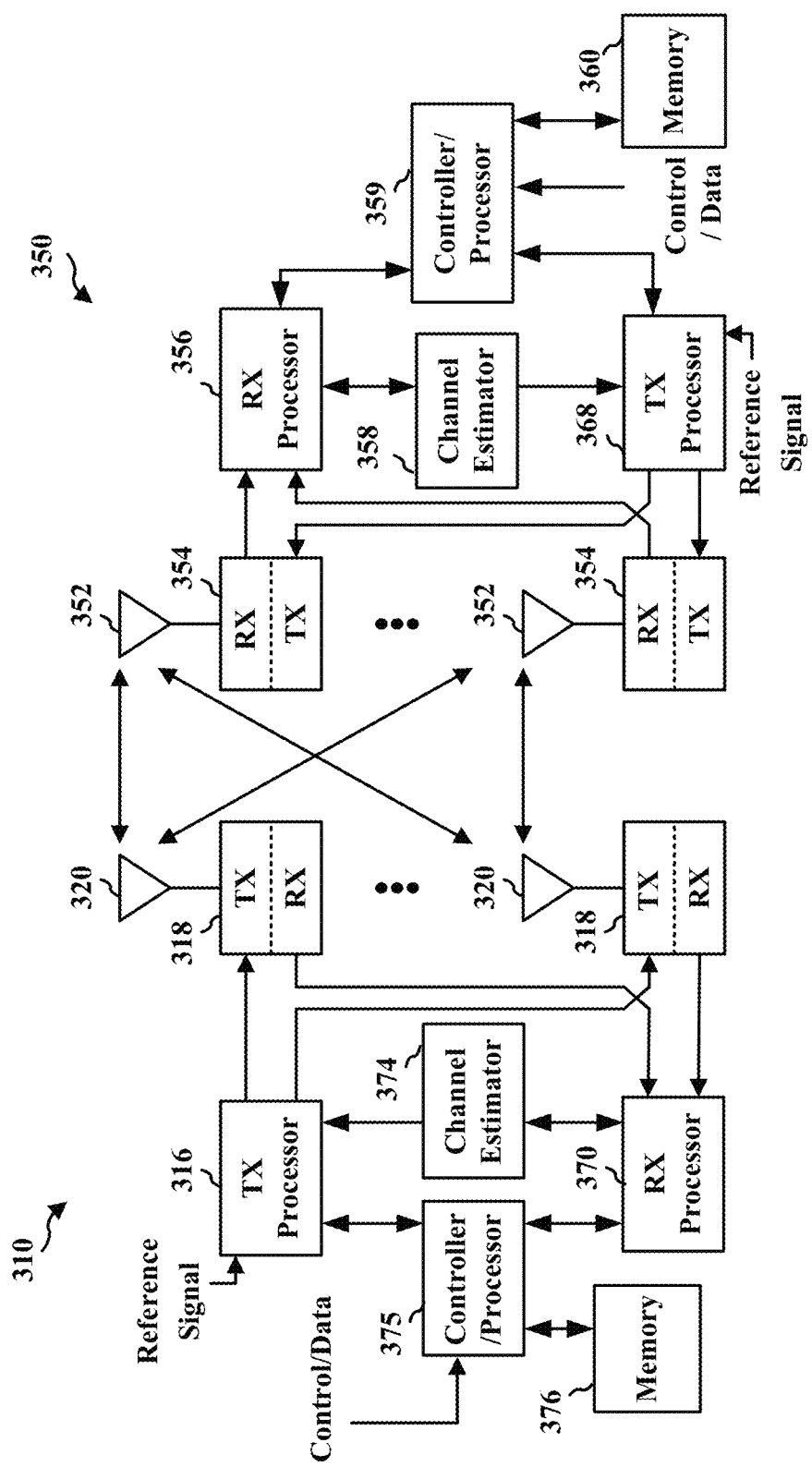
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with FFPL UE component 198 of FIG. 1.

At least one of the TX processor 316, the RX processor 370, and the controller/processor 375 may be configured to perform aspects in connection with FFPL BS component 199 of FIG. 1.

Figure 4:
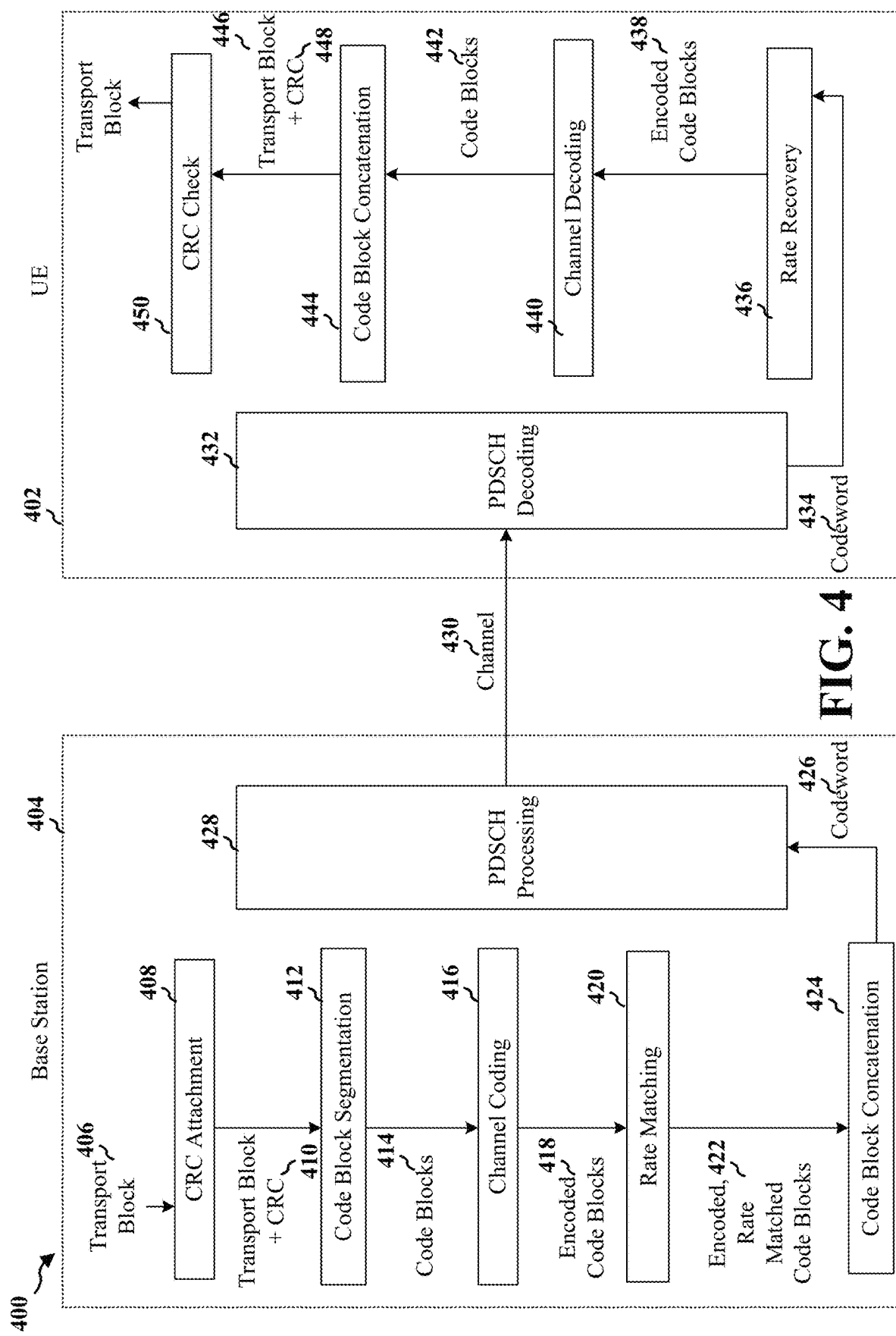
FIG. 4 is a diagram illustrating an example of a downlink data processing flow in which a UE receives one or more code blocks from a base station.

FIG. 4 illustrates an example 400 of a downlink data processing flow in which a UE 402 receives one or more code blocks from a base station 404. Initially, the base station generates a transport block 406 including data to be sent to the UE. At block 408, the base station attaches a cyclic-redundancy check (CRC) 410 to the transport block, which is computed from the input bits of the transport block. Next, at block 412, the base station may segment the transport block with appended CRC into code blocks 414. Each code block may be sized to no larger than a maximum configured code block size (e.g., 3840 bits or 8448 bits depending on a base graph applied), and an additional CRC sequence may be attached to each of the code blocks. Alternatively, if the transport block with appended CRC is itself no larger than the maximum configured code block size, then the base station may not perform code block segmentation. In such case, the transport block may itself be processed as a single code block, or stated another way, the length of the code block equals the length of the transport block (i.e., the length of the transport block here is the total length of transport block 406 and CRC 410). The base station may also add parity bits and insert filler bits to each code block (or the single code block). Then, at block 416, the base station 404 applies channel coding to the code block(s) 414. For instance, the base station may include a LDPC encoder, which encodes the code blocks using the applied base graph and a parity check matrix to form encoded code blocks 418. The encoded code blocks may include systematic bits (the information bits of the code block) and parity bits.

Next, at block 420, the base station 404 applies rate matching to the encoded code blocks. For instance, the base station may match each of the encoded code blocks to a given code rate (e.g., a code rate indicated by a MCS) associated with a CQI reported by the UE in a CSI report. During rate matching of a code block, the base station stores the bits of the encoded code block in a circular buffer (which size may depend on the base graph applied), and reads from the circular buffer a number of bits based on an amount of available resource elements or resource blocks for the transmission. The base station also selects an RV index (e.g., RV 0, 1, 2, or 3), which indicates a starting bit of the circular buffer from which the base station reads the bits. The base station may also interleave the filler bits in the circular buffer with the previously read bits. After thus obtaining the rate matched code block, the base station repeats the above process for the other encoded code blocks. Thus, the base station may form encoded, rate matched code blocks 422.

Once the code block(s) 414 have been encoded and rate matched, at block 424, the base station 404 concatenates the encoded and rate matched code blocks into a codeword 426, and the base station applies PDSCH processing at block 428 to the codeword. For instance, the base station may scramble the codeword, modulate the scrambled codeword into modulated symbols, map the modulated symbols onto one or more layers, apply precoding to the layer-mapped and modulated symbols, and map the precoded symbols to resource elements. The base station may then transmit the codeword in the resource elements over wireless channel 430 to the UE 402 (e.g., using one or more antennas 320 in FIG. 3).

Upon receiving the data from the base station (e.g., using one or more antennas 352 in FIG. 3), the UE may apply PDSCH decoding at block 432, including de-precoding, layer de-mapping, demodulation and descrambling, in order to obtain codeword 434. Afterwards, at block 436, the UE 402 may perform rate recovery. For instance, the UE may perform inverse operations to those applied by the base station during rate matching (e.g., code block concatenation, bit interleaving, bit selection based on an RV index), in response to which the UE may obtain encoded code block(s) 438. After performing rate recovery, the UE may obtain a vector of LLRs, with each LLR corresponding to one of the bits of one of the encoded code block(s). The UE may obtain a vector of LLRs for each encoded code block.

The UE 402 may then, at block 440, perform channel decoding of the encoded code block(s). For instance, the UE may include an LDPC decoder which receives the aforementioned vector of LLRs for an encoded code block as input (i.e., the input LLR vector) and which decodes the input LLR vector through one or more iterations of belief propagation decoding until a new vector of LLRs representing the LDPC-decoded code block (i.e., the output LLR vector corresponding to the decoded code block) is obtained.

The UE may repeat the aforementioned process using the LDPC decoder to decode other encoded code blocks, resulting in code block(s) 442.

Upon obtaining code block(s) 442, at block 444, the UE 402 may concatenate the code blocks to obtain a transport block 446 with appended CRC 448. In the case where a single code block is received (e.g., the code block has a length equal to the length of the transport block and appended CRC), the UE may skip code block concatenation. Afterwards, at block 450, the UE may perform a CRC check. For instance, the UE may compute a CRC from the bits of the transport block 446 and compare the computed CRC with the appended CRC 448. If the computed CRC matches the appended CRC, the UE may determine that the CRC check is successful and conclude that the transport block 446 is successfully decoded. Otherwise, if the computed CRC does not match the appended CRC, the UE may determine that a decoding failure has occurred. Similarly, prior to concatenating the code blocks at block 444, the UE may perform CRC checks of the additional CRC sequences attached to each code block, and the UE may determine whether a code block was successfully or unsuccessfully decoded based on the result of the corresponding CRC check.

Figures 5A, 5B:
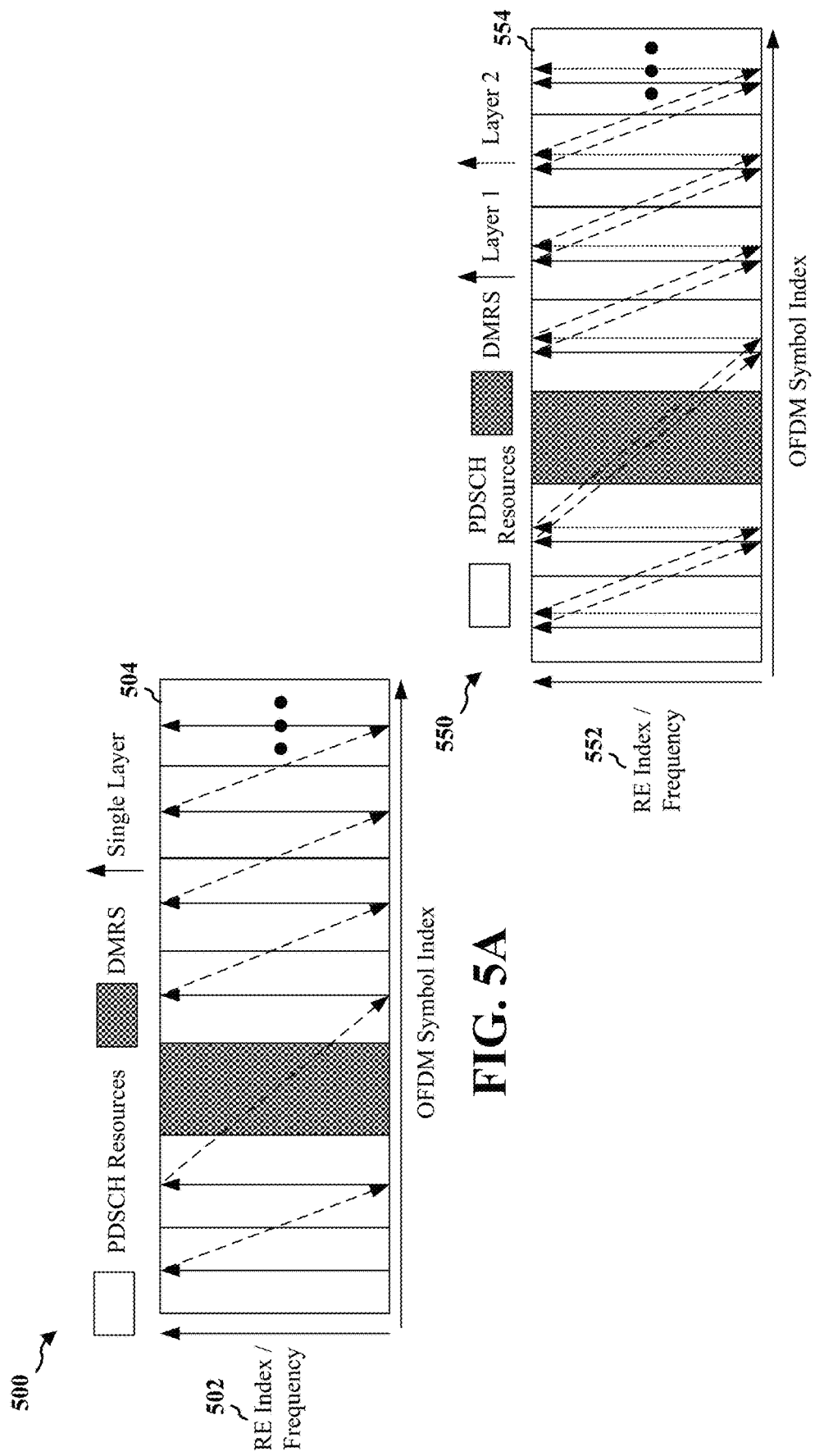
FIGS. 5A and 5B are diagrams illustrating examples of code block mapping in a frequency first manner for one and two layers, respectively.

Generally, during PDSCH processing 428, the base station maps code blocks (e.g., in codeword 426) to REs in a frequency first (FF) manner. In FF mapping, the modulated symbols of a code block in each layer are mapped in parallel to contiguous REs along the frequency dimension from a lowest RE index to a highest RE index (or vice-versa), code block after code block. FIGS. 5A and 5B illustrate examples 500, 550 of code block mapping in a FF manner for one and two layers, respectively. For FF single layer mapping, as illustrated for instance in example 500 of FIG. 5A, the modulated symbols of one or more code blocks may be mapped to RE indices 502 of an OFDM symbol 504 in increasing order of frequency. This process may repeat for each OFDM symbol (excluding DMRS symbols) until the code block(s) are fully mapped, as indicated by the direction of the arrows in FIG. 5A. In other examples, the arrow directions may be reversed in cases where the mapping to RE indices is performed in decreasing order of frequency. Similarly, for FF multiple layer mapping, as illustrated for instance in example 550 of FIG. 5B, the modulated symbols of one or more code blocks may be mapped to RE indices 552 of an OFDM symbol 554 in a parallel manner for each layer. For example, in the case of two layers such as illustrated in example 550, the code block(s) may be mapped in parallel to an RE index of an OFDM symbol in Layer 1 and to the same RE index of the same OFDM symbol in Layer 2, then in parallel to the next RE index of the same OFDM symbol again in Layer 1 and to the same, next RE index of the same OFDM symbol again in Layer 2, and so forth in increasing frequency of the REs over each of the OFDM symbols. This process may repeat for each OFDM symbol (excluding DMRS symbols) until the code block(s) in the multiple layers are fully mapped, as indicated by the direction of the arrows in FIG. 5B. In other examples, the arrow directions may be reversed in cases where the mapping is performed in decreasing order of frequency. Thus, in FF mapping, code block(s) in multiple layers may effectively be assigned to REs in order of frequency and layer, followed by time (OFDM symbol).

Figure 6A:
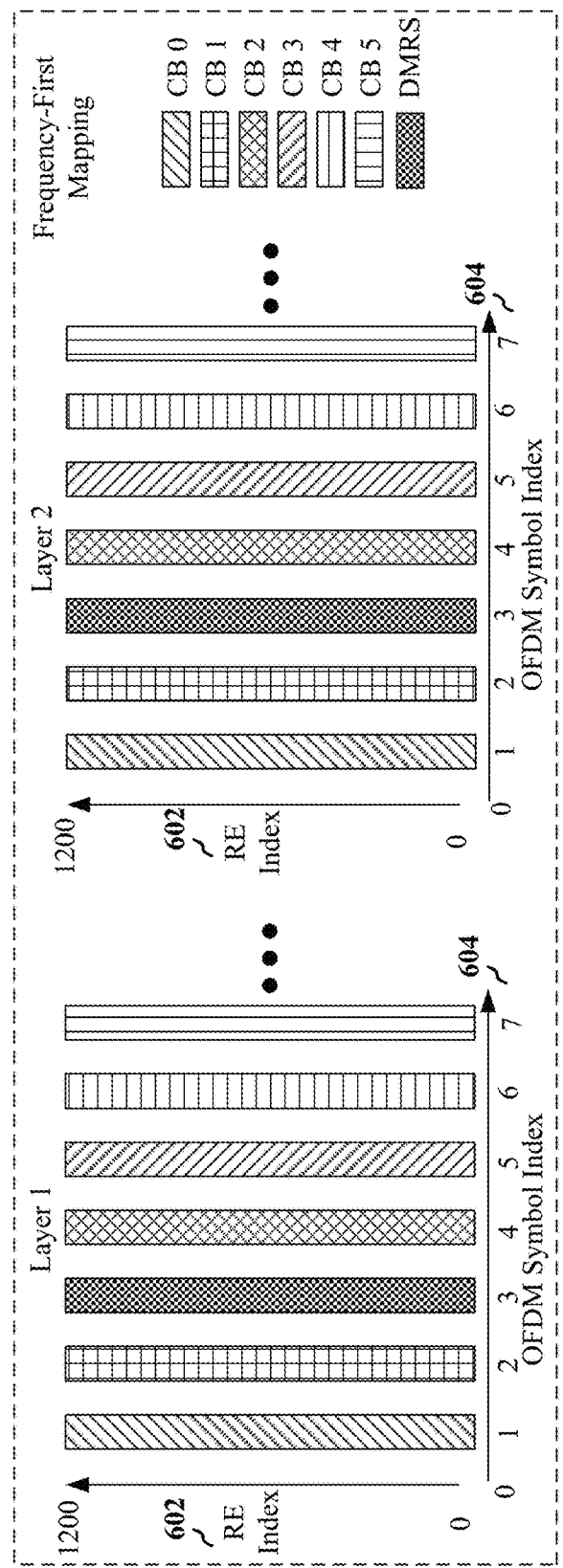
FIGS. 6A and 6B are diagrams illustrating examples of code blocks mapped in a frequency first manner to resource elements in multiple layers.
Figure 6B:
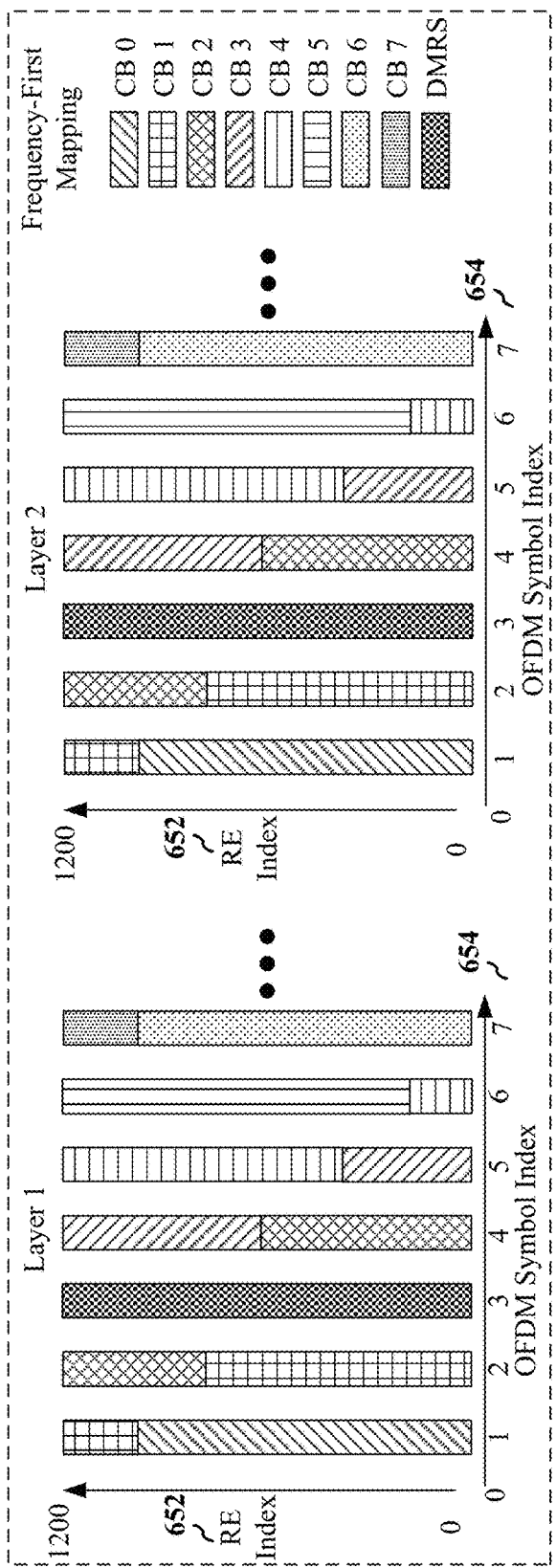

FIGS. 6A and 6B illustrate examples 600, 650 of code blocks (CBs) mapped in a FF manner to REs in multiple layers. In particular, FIG. 6A illustrates the example 600 where each CB is mapped to RE indices 602 in only one OFDM symbol 604 (in parallel across layers 1 and 2), while FIG. 6B illustrates the example 650 where each CB is mapped to RE indices 652 in multiple OFDM symbols 654 (in parallel across layers 1 and 2). In the example of FIG. 6A, each CB occupies the entire bandwidth of a symbol in multiple layers, while in the example of FIG. 6B, each CB occupies a partial bandwidth of a symbol in multiple layers. In either example, the CBs may be mapped to the REs in increasing order of frequency in parallel for each layer, such as described above with respect to FIG. 5B. For example, CB 0 may be mapped in parallel to RE index 0 of symbol 1 in layer 1 and RE index 0 of symbol 1 in layer 2, then in parallel to RE index 1 of symbol 1 in layer 1 and RE index 1 of symbol 1 in layer 2, and so forth for each RE until symbol 1 is fully mapped across layers 1 and 2. After CB 0 is fully mapped to symbol 1 across layers 1 and 2 (over a full or partial bandwidth), the same or different CB may be mapped in a similar manner to the RE indices across the layers in the next symbol 2. This process may continue until all the CBs have fully been assigned to full or partial bandwidths in symbols across the layers (excluding DMRS symbols).

FF mapping may provide frequency diversity in combination with typical interleaving approaches. For example, in FF mapping, the modulated symbols of each code block may be mapped to a same number of resource elements across multiple layers such as illustrated and described above with respect to FIG. 6A (e.g., each code block may be mapped to 1200 REs) and FIG. 6B (each code block may be mapped to 1000 REs). As the REs assigned to each code block may span full or partial bandwidths during a symbol, frequency diversity may be obtained for each code block. Moreover, during PDSCH processing 428, the modulated symbols of code blocks in the codeword 426 may be mapped to resource elements in an interleaved manner using a column-row interleaver, code block by code block. If the REs of a single symbol are assigned to each code block such as illustrated and described above with respect to FIG. 6A, then interleaving applied to the REs may improve frequency diversity since the channel that the UE experiences in one symbol would be represented by a single code block (rather than multiple code blocks). For instance, the interleaving applied to REs of a single code block in a symbol may prevent a fading effect of the channel in that symbol from affecting multiple CBs. Furthermore, even if a fading event affects a number of REs in an OFDM symbol, the interleaving process may spread the effect across all of the bandwidth in that symbol, thus minimizing such fading effect and further improving frequency diversity.

Additionally, FF mapping may also provide layer (spatial) diversity in the case where the base station and UE undergo MIMO transmission with multiple layers. For example, each CB may be spread across multiple layers such as illustrated and described above with respect to FIGS. 6A and 6B (e.g., CB 0 spans two layers, CB 1 spans two layers, etc.). As the REs assigned to each code block may span multiple layers, layer diversity may be obtained for each code block. Moreover, during PDSCH processing 428, the modulated symbols of code blocks in the codeword 426 may be mapped to resource elements across layers in an interleaved manner. Thus, if one layer has a weaker signal-to-noise ratio (SNR) than that of another layer, the interleaving applied to the REs may compensate for the weaker SNR of the former layer, improving layer diversity.

Nevertheless, it would be helpful to allow a different code block mapping strategy than FF mapping in order to further improve at least one of these diversity schemes (e.g., frequency diversity, layer diversity, and other diversity types (e.g., time diversity). For example, CBs spanning multiple RBs such as described above with respect to FIGS. 6A and 6B in a relatively low channel coherency bandwidth (e.g., with a moderate-to-high delay spread) may benefit from enhanced frequency diversity. Moreover, CBs spanning multiple layers such as described above with respect to FIGS. 6A and 6B (having a MIMO rank>1) including an SNR imbalance between layers may benefit from enhanced layer diversity. Yet, as enhancing one diversity scheme may disadvantage another diversity scheme, it would helpful for such other mapping strategy to provide a balance between the diversity schemes.

Accordingly, aspects of the present disclosure describe a frequency first per layer (FFPL) code block mapping scheme which may apply in cases where the UE and base station undergo MIMO communication with a rank>1 (e.g., in cases where code blocks are transmitted and received across multiple layers). FFPL mapping may allow for increased frequency diversity (or time diversity) for each code block over that of FF mapping. Moreover, FFPL mapping may provide a balance between the enhancement to frequency diversity and an expense to layer diversity which may result from FFPL mapping. Furthermore, depending on an allocation scenario (e.g., number of RBs or REs assigned to each CB), channel characteristics (e.g., speed and delay spread), the rank applied to the CB transmission, and an SNR or modulation and coding scheme (MCS) region for the layers, FFPL mapping may provide improved link efficiency, improved reliability, and reduced power consumption (e.g., fewer decoding iterations) over FF mapping. Additionally, the base station may dynamically indicate whether the UE is to apply FFPL mapping as described in more detail below, or whether to merely apply FF mapping as previously described.

Figure 7:
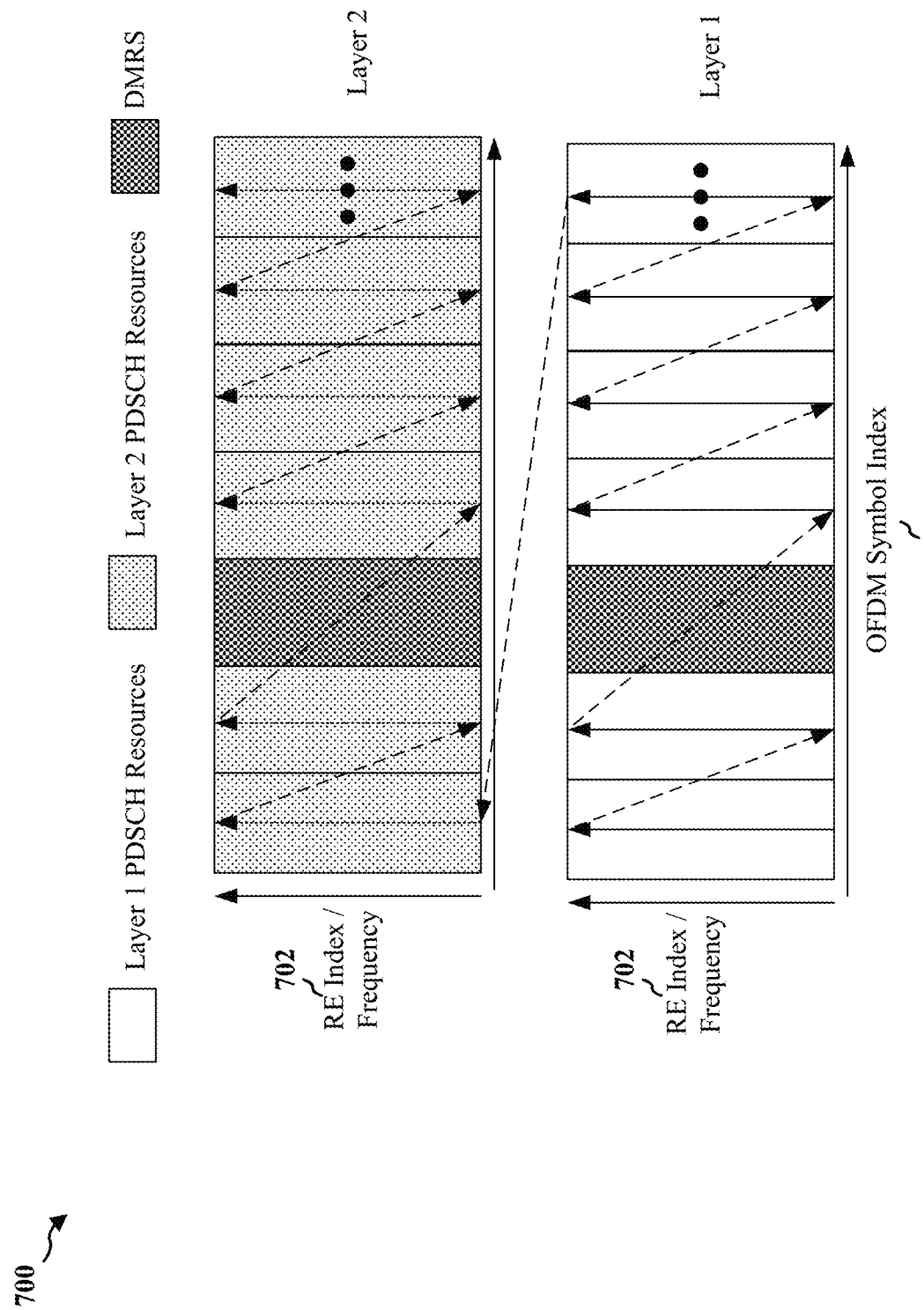
FIG. 7 is a diagram illustrating an example of code block mapping in a frequency first per layer manner for two layers.

In FFPL mapping, the modulated symbols of code block(s) (e.g., in codeword 426) are mapped sequentially in each layer to contiguous REs along the frequency dimension from a lowest RE index to a highest RE index (or vice-versa), code block after code block and layer after layer (rather than in parallel to multiple layers as in FF mapping). FIG. 7 illustrates an example 700 of code block mapping in a FFPL manner for two layers. In FFPL mapping, as illustrated for instance in example 700, the modulated symbols of one or more code blocks may be mapped to RE indices 702 of an OFDM symbol 704 in a sequential manner for each layer. For example, in the case of two layers such as illustrated in example 700, the code block(s) may initially be mapped sequentially to an RE index of an OFDM symbol in layer 1, then to the next RE index of the same OFDM symbol in layer 1, and so forth in increasing frequency of the REs over the same OFDM symbol in layer 1 until the REs in that symbol are fully mapped. This process may then repeat for other OFDM symbols in layer 1 (excluding DMRS symbols) until the code block(s) in that layer are fully mapped, as indicated by the direction of the arrows in the Layer 1 PDSCH resources of FIG. 7. Afterwards, the aforementioned process may repeat for layer 2. For example, as illustrated in example 700, the code block(s) may be mapped sequentially to an RE index of an OFDM symbol in layer 2, then to the next RE index of the same OFDM symbol in layer 2, and so forth in increasing frequency of the REs over the same OFDM symbol in layer 2 until the REs in that symbol are fully mapped. This process may then repeat for other OFDM symbols in Layer 2 (excluding DMRS symbols) until the code block(s) in layer 2 are fully mapped, as indicated by the direction of the arrows in the Layer 2 PDSCH resources of FIG. 7. In cases of more than two layers, the aforementioned process may repeat for mapping code block(s) sequentially to the other layers, with similar arrow directions as in example 700. In other examples, the arrow directions may be reversed in cases where the mapping is performed in decreasing order of frequency. Thus, in FFPL mapping, code block(s) in multiple layers may effectively be assigned to REs in order of frequency and time (OFDM symbol), followed by layer, in contrast to FF mapping.

FIGS. 8A and 8B illustrate examples 800, 850 of CBs mapped in a FFPL manner to REs in multiple layers. In particular, FIGS. 8A and 8B illustrate examples 800, 850 of CBs mapped to RE indices 802, 852 in OFDM symbols 804, 854 sequentially in layers 1 and 2, where each CB occupies the entire bandwidth of each symbol in a given layer in the example 800 of FIG. 8A and each CB occupies a partial bandwidth of at least one symbol in a given layer in the example 850 of FIG. 8B. In either example, the CBs may be mapped to the REs in increasing order of frequency sequentially for each layer, such as described above with respect to FIG. 7. For example, a CB may be mapped to RE index 0 of symbol 1 in layer 1, then RE index 1 of symbol 1 in layer 1, and so forth for each RE until symbol 1 is fully mapped (e.g., to 1200 REs) in layer 1 for one or more CBs. Next, the same or different CB may be mapped in a similar manner to the RE indices of symbol 2 in layer 1, then to symbol 3, and so forth until layer 1 is fully mapped with CBs, after which the process may repeat for layer 2. This process may continue until all the CBs have been assigned to full or partial bandwidths in symbols of each layer (excluding DMRS symbols).

Thus, in FFPL mapping, each of the CB(s) is mapped to only a single layer, in contrast to FF mapping. For instance, with reference to FIG. 7, a CB may only be assigned to Layer 1 PDSCH resources or Layer 2 PDSCH resources, but not both like in FF mapping. For example, as illustrated in the example 800 of FIG. 8A, CBs 0, 1, and 2 may only be mapped to layer 1 while CBs 3, 4, and 5 may only be mapped to layer 2. Similarly, as illustrated in example 850 of FIG. 8B, CBs 0, 1, 2, and 3 may only be mapped to layer 1 while CBs 4, 5, 6, and 7 may only be mapped to layer 2. Furthermore, the data portion corresponding to each layer (e.g. the REs assigned to code block(s) in each layer) may be mapped to the same number of REs (or RBs) and CBs on each layer. For instance, with reference to FIG. 7, the number of CBs mapped to Layer 1 PDSCH resources may be the same as the number of CBs mapped to Layer 2 PDSCH resources, and the number of REs (or RBs) mapped to CB(s) in Layer 1 PDSCH resources may be the same as the number of REs (or RBs) mapped to CB(s) in Layer 2 PDSCH resources. For example, as illustrated in example 800 of FIG. 8A, three CBs (CBs 0, 1, and 2) may each be mapped to 2400 REs in Layer 1, and three CBs (CBs 3, 4, and 5) may each be mapped to 2400 REs in Layer 2. Similarly, as illustrated in example 850 of FIG. 8B, four CBs (CBs 0, 1, 2, and 3) may each be mapped to 2000 REs in Layer 1 (here, CB 3's mapping to REs in symbol 8 is not shown), and four CBs (CBs 4, 5, 6, and 7) may each be mapped to 2000 REs in Layer 2 (here, CB 7's mapping to REs in symbol 8 is similarly not shown). Additionally, the boundaries between the REs (or RBs) assigned to CBs in each layer may be the same between layers (e.g., the layer 1 and layer 2 plots in FIGS. 8A and 8B mirror each other with respect to RE and CB boundaries). For instance, as illustrated in example 800 of FIG. 8A, CB 0 may occupy the same REs (e.g., RE indices 802) in symbols 1 and 2 of Layer 1 as CB 3 in symbols 1 and 2 of Layer 2, CB 1 may occupy the same REs (e.g., RE indices 802) in symbols 4 and 5 of Layer 1 as CB 4 in symbols 4 and 5 of Layer 2, and CB 2 may occupy the same REs (e.g., RE indices 802) in symbols 6 and 7 of Layer 1 as CB 5 in symbols 6 and 7 of Layer 2. Similarly, as illustrated in example 850 of FIG. 8B, CBs 0 and 1 may occupy the same REs (e.g., RE indices 852) in symbols 1 and 2 of Layer 2 as CBs 4 and 5 in symbols 1 and 2 of Layer 2, CBs 0, 1 and 2 may occupy the same REs (e.g., RE indices 802) in symbols 2, 4 and 5 of Layer 1 as CBs 4, 5 and 6 in symbols 2, 4 and 5 of Layer 2, and CBs 1, 2 and 3 may occupy the same REs (e.g., RE indices 802) in symbols 5, 6 and 7 of Layer 1 as CBs 5, 6, and 7 in symbols 5, 6 and 7 of Layer 2.

Generally, when mapping code blocks to REs in a FF manner such as described above with respect to FIGS. 6A and 6B in typical resource allocations (e.g., 100 RBs), ranks (e.g., 2 layers), and MCSs (e.g., less than 256 QAM, or MCSs corresponding to SNRs of approximately 25 decibels (dB) or less), a code block may span no more than one OFDM symbol in a layer (e.g., such as illustrated in example 600). Thus, while FF mapped code blocks in multiple layers may include frequency diversity and layer diversity, such code blocks typically do not include much time diversity. Moreover, the frequency diversity of FF mapped code blocks may be limited in cases of high MCS (e.g., 256-1024 QAM or larger, or MCSs corresponding to SNRs of approximately 25 dB or more), where the size of each code block may be relatively small. For example, while FIG. 6A illustrates an example of each code block spanning 1200 REs per layer in typical MCS regions with relatively ample frequency diversity, in high MCS regions the code blocks may reduce in size to span merely 200 REs (or some other relatively small number of REs) per layer. Thus, FF mapped code blocks spanning a limited number of REs (or RBs) may not fully exploit the available frequency diversity in a layer, resulting in more likelihood of such CBs suffering from frequency fading.

On the other hand, applying FFPL mapping to code blocks such as described above with respect to FIGS. 8A and 8B may provide improved frequency diversity over FF mapping, for example, in cases where a high spectral efficiency link (e.g., a high MCS and a relatively large number of layers (e.g., rank≥2)) exists between the UE and base station. For example, since FFPL mapped code blocks may occupy more REs of an OFDM symbol in a layer compared to FF mapped code blocks (or more OFDM symbols in a layer), e.g., as illustrated in the different mappings between CBs in FIGS. 6A and 8A, FFPL mapped code blocks may include more immunity to frequency fading than FF mapped code blocks. For instance, CB 0 in FIG. 8A may span twice the amount of REs as CB 0 in FIG. 6A (e.g., 2400 REs in symbols 1 and 2 of FIG. 8A vs. 1200 REs in symbol 1 of FIG. 6A). This increase in the number of REs across symbols for each code block, combined with RE interleaving as described above, may minimize a fading effect experienced in the channel during those symbols. Moreover, this increase in number of REs may be particularly significant in high spectral efficiency (high MCS) scenarios where the size of code blocks is typically small (e.g., 200 REs for FF mapped code blocks) and thus the increased number of REs for FFPL mapped code blocks (e.g., 400 REs in this example) may be quite beneficial. Moreover, as FFPL mapped code blocks may span more OFDM symbols per layer than FF mapped code blocks (e.g., as illustrated by the difference between FIGS. 6A and 8A for example), FFPL mapped code blocks may also include more time diversity than FF mapped code blocks.

Nevertheless, FFPL mapped code blocks may in some cases include less layer diversity than FF mapped CBs, since FFPL mapped code blocks are only mapped to a single layer in contrast to FF mapped code blocks. For example, if one layer results in weaker signals than another layer, FFPL mapped CBs on the layer resulting in weaker signals may experience lower decoding probability than FF mapped CBs which may be mapped to all of the layers. However, this sacrifice of layer diversity for FFPL mapping is relatively insignificant in high spectral efficiency (e.g., high MCS or high SNR) scenarios. For instance, in cases where MCS is 256 QAM or greater, SNR is 25 dB or greater, or in other high spectral efficiency scenarios, a minimal likelihood may exist that one layer results in significantly weaker signals than another layer. As a result, FFPL mapping may provide improved frequency diversity or time diversity (and thus performance) at minimal expense to layer diversity in such scenarios. Such balance between frequency/time diversity and layer diversity may be further improved as the number of layers increases.

In addition to deprioritizing layer diversity in favor of increased frequency diversity (and time diversity to some extent), FFPL mapping may allow a UE to apply successive interference cancellation (SIC) de-mapping operations, such as Minimum-Mean-Square-Error (MMSE)-SIC (MMSE-SIC), in order to decode FFPL mapped CB(s). For instance, SIC de-mapping allows a UE to sequentially decode CB(s) on respective layers, while eliminating cross-layer leakage, by initially decoding a layer having the strongest signal and subtracting the decoded signal from the received signal, then by decoding another layer having the next strongest signal and subtracting the decoded signal again from the received signal, and so forth for each layer until all of the layers have been decoded. SIC operations such as MMSE-SIC may not be possible to apply for decoding of FF mapped CB(s), since these CBs are spread across multiple layers and thus cannot be decoded individually per layer as in SIC (e.g., SIC would only allow a UE to acquire part of a CB). However, these SIC operations may be applicable for FFPL mapped CB(s) since these CBs are exclusive to each layer. Moreover, SIC operations such as MMSE-SIC may have reduced decoding complexity compared to other decoding algorithms such as per-stream recursive de-mapping (PSRD), especially in cases where the rank is fairly high (e.g., 8) and thus PSRD may be too complex. For instance, SIC operations such as MMSE-SIC as applied to FFPL mapped CB(s) may result in reduced complexity, greater performance improvements and reduced power consumption than PSRD.

Figure 9:
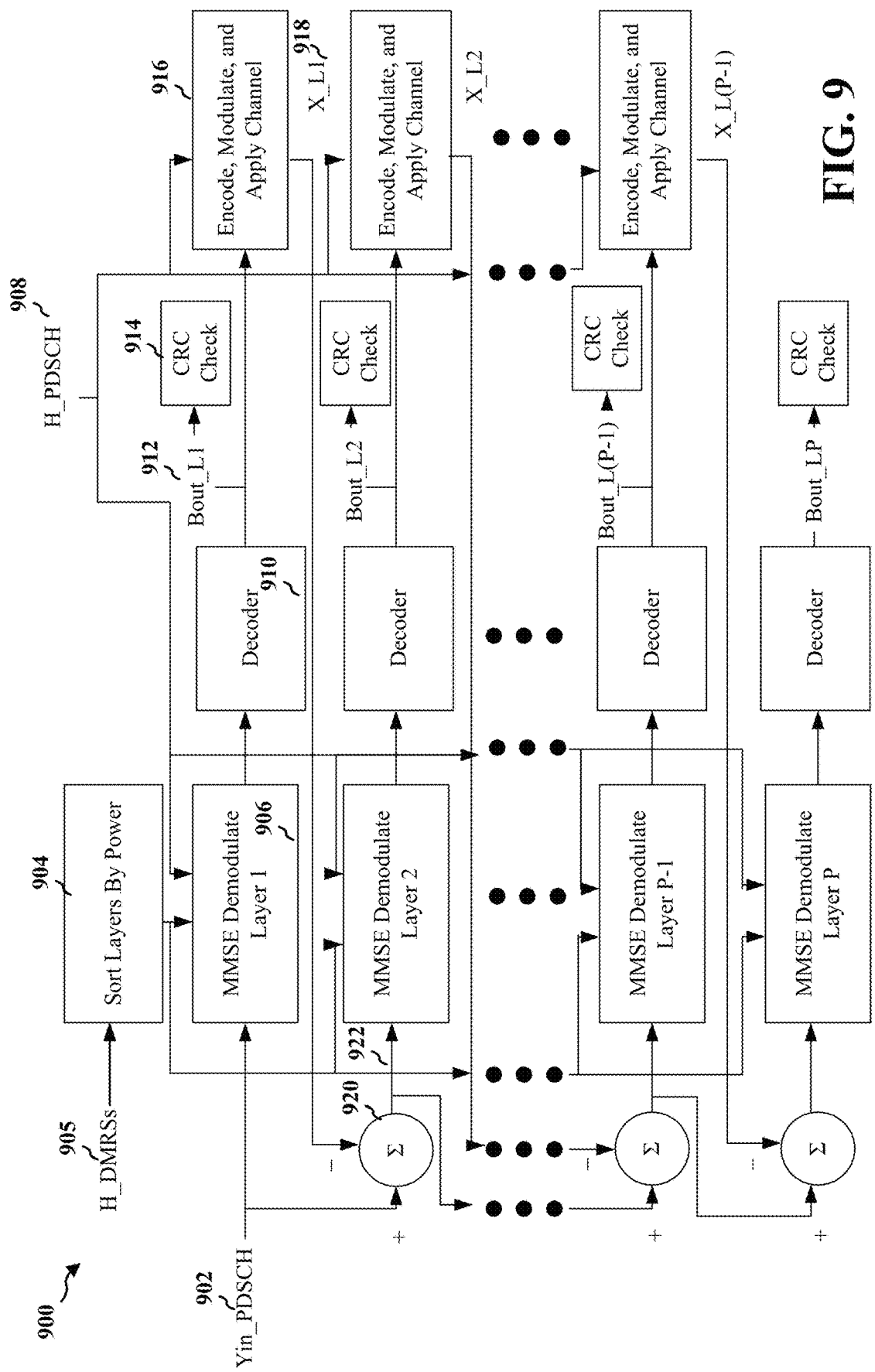
FIG. 9 is a diagram illustrating an example of a successive interference cancellation de-mapping operation which the UE may perform on data received over multiple layers.

FIG. 9 illustrates an example 900 of a MMSE-SIC de-mapping operation which the UE may perform on data 902 received in a PDSCH (Yin PDSCH) over multiple layers (i.e., P layers). For instance, the MMSE-SIC de-mapping operation may be performed during PDSCH decoding 432 and/or channel decoding 440 in FIG. 4. Moreover, data 902 may be a received signal containing a superposition of all P spatial layers in this example. Initially, at block 904, the UE sorts each of the P layers in descending order of power based on DMRS channel estimates 905 (H_DMRSs) in all of the layers, rather than sorting by layer index. Thus, in the example of FIG. 9, Layer 1 (or L1) refers to the layer identified to have the strongest power level (e.g., having the largest received signal strength indicator [RSSI] or other similar metric), Layer 2 (or L2) refers to the layer identified to have the second strongest power level, and so forth, until Layer P−1 (or L(P−1)) which refers to the layer identified to have the second weakest power level, and Layer P (or LP) which refers to the layer identified to have the weakest power level.

After sorting the layers by power, at block 906, the UE demodulates the data 902 in Layer 1 based on a PDSCH channel estimate 908 identified for the modulated symbols on all of the layers (H_PDSCH). For example, referring to FIG. 4, block 906 may be performed during PDSCH decoding 432 (in particular, during demodulation) based on minimum mean square errors identified from the PDSCH channel estimate 908 between the modulation symbols mapped to the layer index associated with Layer 1 (the strongest power layer). Then, at block 910, the UE decodes the demodulated data in Layer 1 to extract the Layer 1 code block(s) 912 (Bout_L1). For example, referring to FIG. 4, block 910 may be performed during channel decoding 440 (e.g., using an LDPC decoder) to obtain the code block(s) 442 mapped to the layer index associated with Layer 1 (the strongest power layer). Next, at block 914, the UE performs a CRC check to confirm whether the code blocks on Layer 1 were successfully decoded. For example, block 914 may correspond to CRC check 450 of FIG. 4. If the UE determines from the CRC check that the code blocks on Layer 1 were successfully decoded, then at block 916, the UE may encode, modulate, and apply the PDSCH channel estimate 908 to arrive at Layer 1 data 918 (X_L1). For example, at block 916, the UE may perform LDPC encoding to obtain a codeword including the Layer 1 code block(s) (e.g., similarly to when the base station performs channel coding at block 416 in FIG. 4), modulate the codeword to form modulation symbols mapped to Layer 1 (the strongest power layer) (e.g., similarly to when the base station performs PDSCH processing 428 in FIG. 4), and apply the PDSCH channel estimate to the layer-mapped and modulated symbols to simulate channel effects and effectively reconstruct the originally received data.

After obtaining Layer 1 data 918, at block 920, the UE may subtract the Layer 1 data from the data 902 to arrive at data 922 for the next layer. As data 922 excludes the modulated symbols mapped to Layer 1, and since Layer 2 is the next strongest power layer, the UE may re-iterate the above steps described at blocks 906, 910, 914, 916, and 920 for Layer 2. For instance, the UE may similarly demodulate the data 922 in Layer 2 based on the PDSCH channel estimate 908 and minimum mean square errors, decode the demodulated data in Layer 2 to extract the Layer 2 code block(s) (Bout_L2), perform a CRC check to confirm whether the code blocks on Layer 2 were successfully decoded, encode, modulate, and apply the PDSCH channel estimate 908 to arrive at Layer 2 data (X_L2), and subtract the Layer 2 data from the data 922 to arrive at data for the next layer. The UE may continue this iterative process of successively canceling interfering signals per layer in MMSE-SIC for all P layers until all of the layers have been successfully decoded.

However, since each CRC check is performed for a specific layer, if any of the CRC checks fail, the subsequent layers may not be reliably decoded and the de-mapping operation may stop. Such failed CRC checks may typically arise in FF mapped code blocks, since those CBs may span across multiple layers and therefore the data decoded in one layer may not complete the CB. In contrast, the likelihood of failed CRC checks may be reduced in FFPL mapped code blocks, since those CBs are exclusive to a single layer and therefore the decoded data in one layer may complete the CB. Thus, UEs may perform MMSE-SIC or other SIC de-mapping operations for FFPL mapped code blocks, but not for FF mapped code blocks, which in turn may be limited to more complex decoding operations such as PSRD. Alternatively, such UEs may perform PSRD or other decoding operations other than SIC for FFPL mapped blocks.

Figure 11:
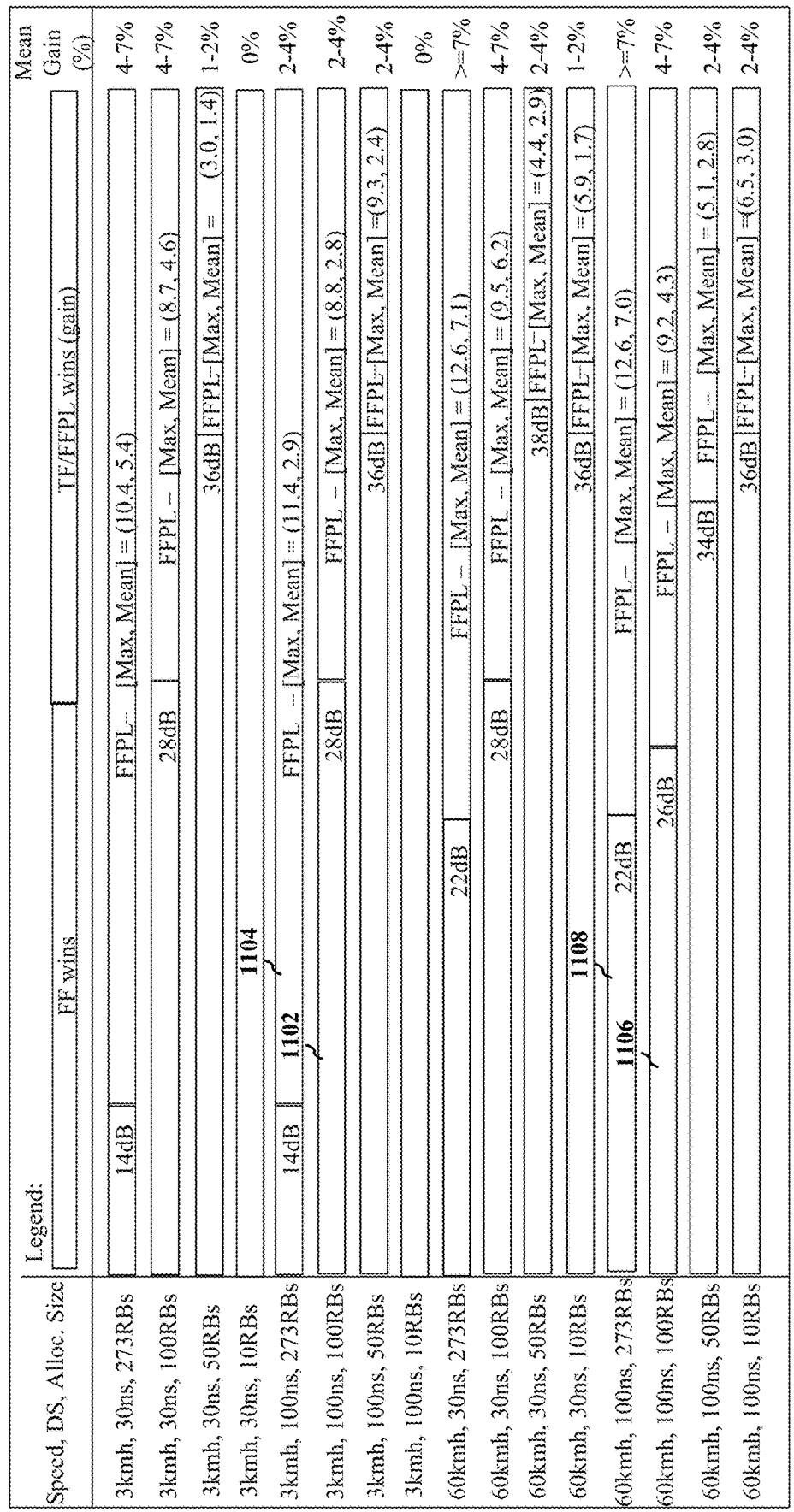
FIG. 11 is a diagram illustrating an example table of various throughput gains of frequency first per layer mapped code blocks over frequency first mapped code blocks in different scenarios including those referenced in FIGS. 10A-10D.

FIGS. 10A-10D illustrate examples 1000, 1020, 1040, 1060 of simulation results showing throughput gains of FFPL mapped code blocks over FF mapped code blocks in different scenarios. Additionally, FIG. 11 illustrates an example table 1100 of various throughput gains of FFPL mapped code blocks over FF mapped code blocks in different scenarios including those scenarios illustrated in FIGS. 10A-10D. These gains may be achieved from FFPL mapping in high spectral efficiency cases (e.g., MCSs of 256 QAM with ranks up to 4 layers) with SNRs above a scenario-dependent threshold (e.g., depending on data speed, delay spread, and allocation size) and low UE mobility. For instance, example 1000, 1102 of FIGS. 10A and 11 illustrate FFPL throughput gains (e.g., maximum and mean gains of 8.8% and 2.8% respectively over FF) for data speeds of 3 km/hr, a delay spread of 100 ns, and an allocation size of 100 RBs for code blocks beginning at SNRs of approximately 28 dB. Example 1020, 1104 of FIGS. 10B and 11 illustrate FFPL throughput gains (e.g., maximum and mean gains of 11.4% and 2.9% respectively over FF) for data speeds of 3 km/hr, a delay spread of 100 ns, and an allocation size of 273 RBs for code blocks beginning at SNRs of approximately 14 dB. Example 1040, 1106 of FIGS. 10C and 11 illustrate FFPL throughput gains (e.g., maximum and mean gains of 9.2% and 4.3% respectively over FF) for data speeds of 60 km/hr, a delay spread of 100 ns, and an allocation size of 100 RBs for code blocks beginning at SNRs of approximately 26 dB. Example 1060, 1108 of FIGS. 10D and 11 illustrate FFPL throughput gains (e.g., maximum and mean gains of 12.6% and 7.0% respectively over FF) for data speeds of 60 km/hr, a delay spread of 100 ns, and an allocation size of 273 RBs for code blocks beginning at SNRs of approximately 22 dB. These and other examples of FFPL throughput gains (e.g., as illustrated in FIG. 11) may be observed by UEs which perform PSRD or other decoding operations other than SIC for FFPL mapped blocks. Furthermore, additional gains than those illustrated may be observed by UEs which perform MMSE-SIC or other SIC de-mapping operation of FFPL mapped code blocks, as well as be observed in cases of even higher order modulation (e.g., MCSs of 1024 QAM) and higher rank (e.g., ranks with more than 4 layers).

Therefore, in comparison to FF mapped code blocks, FFPL mapped code blocks may support increased frequency diversity (and time diversity) at minimal expense to layer diversity, as well as allow for better link efficiency, improved reliability, and reduced power consumption to be achieved. In order to support FFPL mapping, a modified code block segmentation procedure may be provided (e.g., an adjustment to code block segmentation at block 412 or to other processes in FIG. 4) which allows the base station to separate code blocks between layers in different scenarios (e.g., allocation sizes, etc.) such that each code block is only within a single layer. Moreover, a modified mapping procedure may be provided (e.g., an adjustment to PDSCH processing 428 or to other processes in FIG. 4) which allows the base station to select to apply either FFPL mapping or FF mapping to code blocks based on a current scenario (e.g., allocation size, communication link, channel characteristics, etc.). In one example, the base station may select to apply one of these mapping types (e.g., FFPL or FF) without UE assistance, e.g., based on channel state information (CSI) and channel characteristics which the base station may measure or estimate from uplink information such as SRS. In another example, the base station may select to apply one of these mapping types partially based on UE-reported measurements or estimations (e.g., CSI) from downlink information such as CSI-RS. In a further example, the base station may select to apply one of these mapping types with UE assistance, e.g., based on a UE recommendation indicating the UE's preferred mapping type (FFPL or FF) for a period of time, rather than from UE-reported measurements or channel estimations. Such modifications to the code block segmentation and mapping procedures may apply to code blocks including data transmissions in PDSCH or PUSCH (e.g., LDPC-coded data) as opposed to control signals (e.g., polar coded control information).

Typically, when the base station performs code block segmentation (e.g., at block 412 in FIG. 4), the base station determines whether the number of bits B in a transport block is larger than a maximum code block size $K_{cb}$ (e.g., 8448 or 3840 depending on an LDPC base graph applied). If $B > K_{cb}$, the base station segments the bits of the transport block into a number of code blocks C and attaches an additional CRC sequence of L=24 bits to each of the code blocks. In particular, the base station applies the following ceiling function to determine the number of code blocks C:

$$C = \lceil B/(K_{cb} - L) \rceil \quad (1)$$

However, this procedure does not guarantee that the number of code blocks C is perfectly divisible by the number of layers P to which the code blocks are mapped, or in other words, that C modulus P is 0 (i.e., mod(C, P)=0 or the remainder of C/P=0). For example, if B=258652, $K_{cb}$=8448, L=24, and P=4, then C=31 based on Equation (1) above, which is not perfectly divisible by 4 (31 mod 4≠0). As a result of this lack of divisibility, the base station may not be able to apply FFPL mapping to the code blocks, since the code blocks may not all be mappable to only a single layer or to the same resource element indices of corresponding symbols across layers. For example, at least one of the C code blocks may be shared between multiple layers and therefore each CB may not be exclusive to a single layer. For instance, with reference to FIG. 7, a CB may be assigned to Layer 1 PDSCH resources and Layer 2 PDSCH resources if C is not perfectly divisible by P. Moreover, the boundaries between the REs (or RBs) assigned to CBs in each layer may not be the same between layers. For instance, referring to FIGS. 8A and 8B, the layer 1 and layer 2 plots in FIGS. 8A and 8B may no longer mirror each other with respect to RE and CB boundaries if C is not perfectly divisible by P.

To ensure that the number of code blocks C is perfectly divisible by the number of layers P and therefore support FFPL mapping, the base station may apply a modification of the above Equation (1) during code block segmentation such that the number of code blocks is a function of the number of layers, as follows:

$$C = P * \left\lceil \frac{B}{P} / (K_{cb} - L) \right\rceil \quad (2)$$

The modification shown by Equation (2) may effectively act as a ceiling operator which rounds the number of code blocks C up to a number perfectly divisible by the number of layers P. For example, if B=258652, $K_{cb}$=8448, L=24, and P=4, then C=32 based on Equation (2) above (rather than C=31 as in Equation (1)), which is perfectly divisible by 4 (32 mod 4=0). After segmenting the code blocks based on Equation (2) above and attaching the additional CRC sequence to each of the code blocks during the code block segmentation process, the base station may process the code blocks similarly to that described above with respect to FIG. 4 (e.g., performing channel coding, rate matching, code block concatenation, and PDSCH processing). As a result, the base station may allocate a same number of CBs to each layer and maintain the same boundaries between the REs (or RBs) assigned to CBs across layers. For example, if C=32 and P=4, then the base station may map 8 CBs to each of the four layers, as well as map CBs in corresponding symbols to the same RE indices of each of the four layers, similar to that illustrated in FIGS. 8A and 8B.

Additionally, when the base station typically performs layer mapping (e.g., during PDSCH processing 428 in FIG. 4), the base station maps complex-valued modulated symbols for a codeword (including code blocks) onto layers such that consecutive modulation symbols are mapped to different layers. For example, if the number of layers is 2, the base station may map modulation symbol 0 on layer 1, modulation symbol 1 on layer 2, modulation symbol 2 on layer 1, modulation symbol 3 on layer 2, and so forth in alternating fashion. Since each code block may include multiple consecutive modulation symbols, the code blocks may be split between layers and subsequently mapped to REs on each layer in parallel. As a result of this multiple layer mapping of code blocks to REs, the base station may not be able to apply FFPL mapping to the code blocks since the code blocks are not exclusive to each layer.

Therefore, to ensure that each code block (in a number of code blocks C) is mapped to only one layer (of a number of layers P) and therefore supports FFPL mapping, the base station may modify the PDSCH processing such that each layer index is allocated with corresponding CB indices. For instance, the base station may assign each layer index p, where p=0, ..., P−1 with CBs corresponding to CB indices $[p*(C/P), \ldots (p+1)*(C/P)-1]$. As an example, if P=4 and C=16, then the base station may allocate layer 1 (corresponding to index p=0) with CBs corresponding to CB indices [0, 1, 2, 3], layer 2 (corresponding to index p=1) with CBs corresponding to CB indices [4, 5, 6, 7], layer 3 (corresponding to index p=2) with CBs corresponding to CB indices [8, 9, 10, 11], and layer 4 (corresponding to index p=3) with CBs corresponding to CB indices [12, 13, 14, 15]. When the base station performs layer mapping and resource element mapping during PDSCH processing, the base station may apply these CB indices in mapping modulation symbols to layers and subsequently to REs. For instance, the base station may map the modulation symbols of CBs 0, 4, 8, and 12 to layer 1, the modulation symbols of CBs 1, 5, 9, and 13 to layer 2, the modulation symbols of CBs 2, 6, 10, and 14 to layer 3, and the modulation symbols of CBs 3, 7, 11, and 15 to layer 4. The base station may afterwards apply the layer-mapped, modulation symbols to the REs in each layer sequentially in a FFPL manner (e.g., first by frequency, then by time, and then by layer). As a result, full separation between layers for CBs may be achieved. Moreover, since each CB is exclusive to a single layer, the UE may apply SIC to successfully decode each code block. For example, the UE may decode a received codeword including multiple code blocks after performing the MMSE-SIC procedure described above with respect to FIG. 9.

Accordingly, aspects of the present disclosure allow for a base station to transmit code blocks according to FFPL mapping, and for a UE to decode received code blocks according to the FFPL mapping. The FFPL mapping may provide improvements in link efficiency and reliability over typical FF mapping approaches. For example, FFPL mapped code blocks may include more frequency diversity (and time diversity) than FF mapped code blocks, with minimal expense to layer diversity in FFPL mapped code blocks. Moreover, UEs may perform a SIC de-mapping operation (e.g., MMSE-SIC) to decode FFPL mapped code blocks, resulting in significant performance improvements over FF mapped code blocks for high number of layers (e.g., rank≥2). Additionally, FFPL mapped code blocks may result in reduced power consumption in certain scenarios, for instance, by allowing UEs to apply fewer decoding iterations in MMSE-SIC than in PSRD in high numbers of layers.

Figure 12:
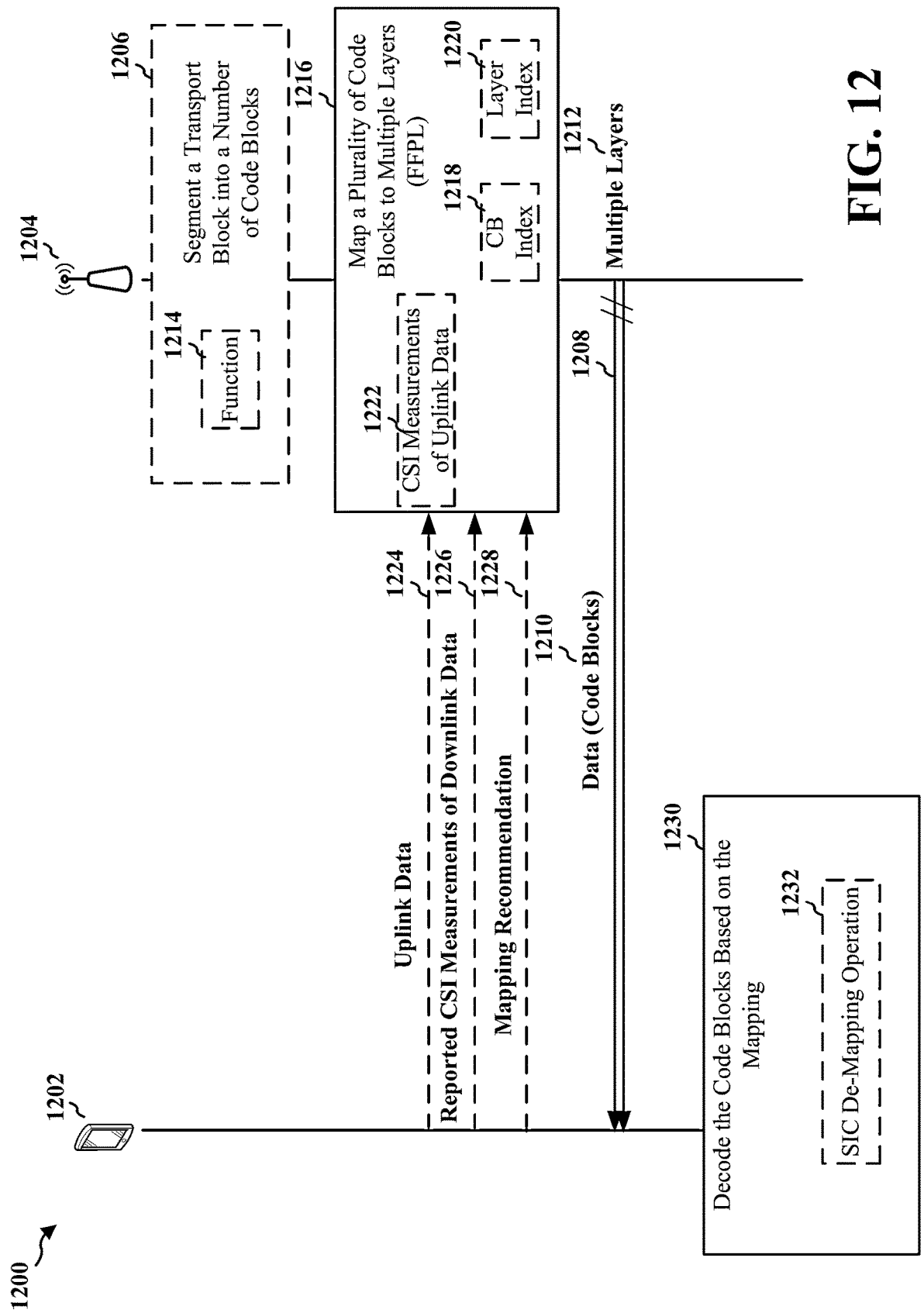
FIG. 12 is a diagram illustrating an example of a call flow between a UE and a base station.

FIG. 12 is an example 1200 of a call flow diagram between a UE 1202 and a base station 1204. Initially, at block 1206, the base station may segment a transport block into a number of code blocks. For example, referring to FIG. 4, at block 412, the base station 404 may segment transport block 406 (including data 1208 to be sent to UE 402) into code blocks 414. The base station 1204 may provide the data 1208 including code blocks 1210 to the UE 1202 in multiple layers 1212, and the number of the code blocks may be a function 1214 of a number of the layers. For instance, during code block segmentation, the base station may apply the function given by Equation (2) above to segment the code blocks into a number of code blocks C that is perfectly divisible by the number of layers P.

At block 1216, the base station 1204 may map the code blocks 1210 to the multiple layers 1212 according to FFPL mapping. The base station may perform the FFPL mapping, for example, during PDSCH processing 428 of FIG. 4, based on a code block index 1218 for each of the code blocks 1210 and a layer index 1220 for each of the layers 1212. For instance, the base station may assign each layer index p, where p=0, ..., P−1 with CBs corresponding to CB indices $[p*(C/P), \ldots (p+1)*(C/P)-1]$. After mapping the modulation symbols of each code block index to layer indices, the base station may apply the layer-mapped, modulation symbols to the REs frequency first for each layer. For instance, referring to FIGS. 7, 8A, and 8B, the base station may map modulated symbols of each of the code blocks 1210, sequentially in each of the layers 1212, to contiguous RE indices 702, 802, 852 along the frequency domain from a lowest RE index to a highest RE index (or vice-versa), for each of the OFDM symbols 704, 804, 854, code block after code block, and layer after layer. That is, the base station may map code blocks to REs in order of frequency followed by time followed by layer, resulting in each of the code blocks 1210 being mapped to only one of the layers 1212 such as illustrated in the examples of FIGS. 8A and 8B.

Additionally, the base station 1204 may select one of multiple mapping types (e.g., FFPL or FF) to apply when mapping the code blocks 1210 to the multiple layers 1212 at block 1216. In one example, the selection may be based on CSI measurements 1222 of uplink data 1224 from the UE 1202. For instance, the base station may select to apply one of these mapping types without UE assistance, e.g., based on CSI and channel characteristics which the base station may measure or estimate from uplink information such as SRS. In another example, the selection may be based on reported CSI measurements 1226 of downlink data previously sent from the base station. For instance, the base station may select to apply one of these mapping types partially based on UE-reported measurements or estimations (e.g., CSI) from downlink information such as CSI-RS. In a further example, the selection may be based on a mapping recommendation 1228 from the UE. For instance, the base station may select to apply one of these mapping types with UE assistance, e.g., based on a UE recommendation indicating the UE's preferred mapping type (FFPL or FF) for a period of time, rather than from UE-reported measurements or channel estimations.

After performing the code block segmentation and mapping, the base station 1204 may transmit the data 1208 including the code blocks 1210 to the UE 1202 over multiple layers 1212. For instance, referring to FIGS. 3 and 4, the base station 310, 404 may transmit, using antennas 320 over multiple layers, the FFPL mapped code blocks over channel 430. The UE may also receive the data 1208 including the code blocks 1210 over the multiple layers. For instance, referring to FIGS. 3 and 4, the UE 350, 402 may receive, using antennas 352 over multiple layers, the FFPL mapped code blocks over the channel. In response to receiving the code blocks 1210, at block 1230, the UE may decode the code blocks based on the mapping applied by the base station (at block 1216). For instance, referring to FIG. 4, the UE 402 may layer de-map the data received over channel 430 (e.g., during PDSCH decoding 432) in response to a determination that the association of each layer index 1220 with a corresponding code block index 1218 is such that each code block is exclusive to a single layer (e.g., a determination that the code blocks were mapped according to a FFPL mapping, as illustrated for example in FIGS. 8A and 8B). The UE may perform this layer de-mapping (as well as other PDSCH decoding processes such as demodulation and descrambling) in response to determining that the data is received in a PDSCH (e.g., the data is LDPC-coded). After performing the PDSCH decoding of the received data, the UE may obtain the code blocks from the data (e.g., in response to channel decoding at block 440 and a CRC check at block 440). Thus, the UE may decode the FFPL mapped code blocks. In another example, at block 1232, the UE may perform a SIC de-mapping operation on the data 1208 (e.g., an MMSE-SIC de-mapping operation such as described above with respect to FIG. 9), which may encompass at least the layer de-mapping, channel decoding, and CRC check operations, and the UE may obtain the code blocks 1210 from the data after performing the SIC de-mapping operation.

Figure 13:
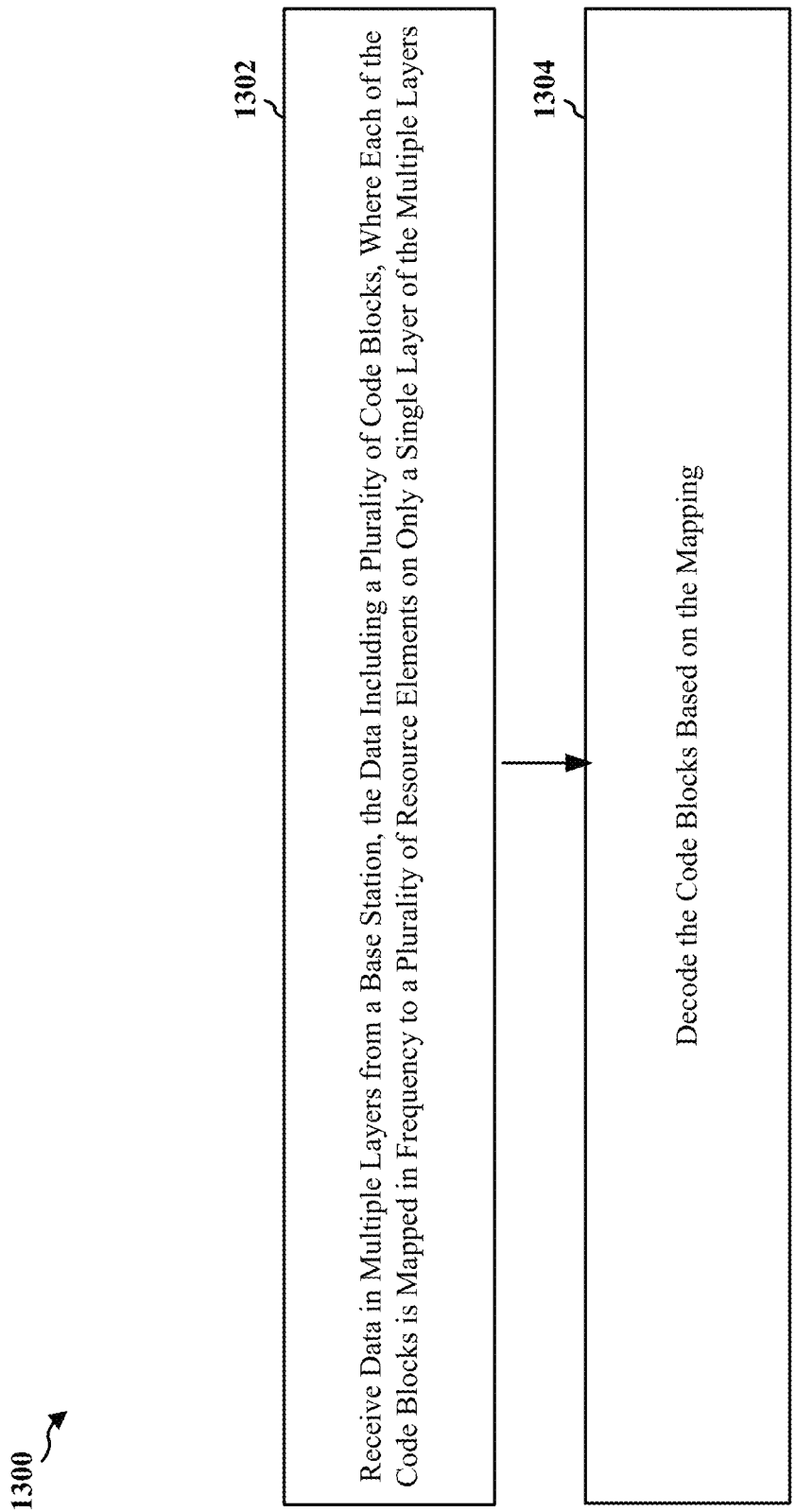
FIG. 13 is a flowchart of a method of wireless communication at a UE.

FIG. 13 is a flowchart 1300 of a method of wireless communication. The method may be performed by a UE (e.g., the UE 104, 350, 402, 1202; the apparatus 1502). The method allows a UE to receive and decode FFPL mapped code blocks from a base station.

At 1302, the UE receives data in multiple layers from a base station, the data including a plurality of code blocks, where each of the code blocks is mapped to a plurality of resource elements initially by frequency and subsequently by time on only a single layer of the multiple layers. For example, 1302 may be performed by code block reception component 1540. For instance, referring to FIG. 12, the UE 1202 may receive data 1208 in multiple layers 1212 from base station 1204. Moreover, referring to FIGS. 7, 8A, 8B, and 12, the data 1208 may include code blocks 1210, where each of the code blocks is mapped to RE indices 702, 802, 852 along the frequency domain from a lowest RE index to a highest RE index (or vice-versa), for each of the OFDM symbols 704, 804, 854, code block after code block, and layer after layer. That is, the code blocks may be mapped to REs in order of frequency followed by time followed by layer, resulting in each of the code blocks 1210 being mapped to only one of the layers 1212 such as illustrated in the examples of FIGS. 8A and 8B.

In one example, each of the layers may include a same number of the code blocks. For example, referring to FIGS. 7, 8A, and 8B, the data portion corresponding to each layer (e.g. the REs assigned to code block(s) in each layer) may be mapped to the same number of REs (or RBs) and CBs on each layer. For instance, with reference to FIG. 7, the number of CBs mapped to Layer 1 PDSCH resources may be the same as the number of CBs mapped to Layer 2 PDSCH resources, and the number of REs (or RBs) mapped to CB(s) in Layer 1 PDSCH resources may be the same as the number of REs (or RBs) mapped to CB(s) in Layer 2 PDSCH resources. For example, as illustrated in example 800 of FIG. 8A, three CBs (CBs 0, 1, and 2) may each be mapped to 2400 REs in Layer 1, and three CBs (CBs 3, 4, and 5) may each be mapped to 2400 REs in Layer 2. Similarly, as illustrated in example 850 of FIG. 8B, four CBs (CBs 0, 1, 2, and 3) may each be mapped to 2000 REs in Layer 1 (here, CB 3's mapping to REs in symbol 8 is not shown), and four CBs (CBs 4, 5, 6, and 7) may each be mapped to 2000 REs in Layer 2 (here, CB 7's mapping to REs in symbol 8 is similarly not shown).

In one example, the code blocks in corresponding symbols of the layers may be mapped to same resource element indices in all of the layers. For example, referring to FIGS. 7, 8A, and 8B, the boundaries between the REs (or RBs) assigned to CBs in each layer may be the same between layers (e.g., the layer 1 and layer 2 plots in FIGS. 8A and 8B mirror each other with respect to RE and CB boundaries). For instance, as illustrated in example 800 of FIG. 8A, CB 0 may occupy the same REs (e.g., RE indices 802) in symbols 1 and 2 of Layer 1 as CB 3 in symbols 1 and 2 of Layer 2, CB 1 may occupy the same REs (e.g., RE indices 802) in symbols 4 and 5 of Layer 1 as CB 4 in symbols 4 and 5 of Layer 2, and CB 2 may occupy the same REs (e.g., RE indices 802) in symbols 6 and 7 of Layer 1 as CB 5 in symbols 6 and 7 of Layer 2. Similarly, as illustrated in example 850 of FIG. 8B, CBs 0 and 1 may occupy the same REs (e.g., RE indices 852) in symbols 1 and 2 of Layer 2 as CBs 4 and 5 in symbols 1 and 2 of Layer 2, CBs 0, 1 and 2 may occupy the same REs (e.g., RE indices 802) in symbols 2, 4 and 5 of Layer 1 as CBs 4, 5 and 6 in symbols 2, 4 and 5 of Layer 2, and CBs 1, 2 and 3 may occupy the same REs (e.g., RE indices 802) in symbols 5, 6 and 7 of Layer 1 as CBs 5, 6, and 7 in symbols 5, 6 and 7 of Layer 2.

In one example, the code blocks may be mapped to the resource elements in one of the layers before the code blocks in another one of the layers are mapped. For example, referring to FIG. 7, the modulated symbols of one or more code blocks may be mapped to RE indices 702 of an OFDM symbol 704 in a sequential manner for each layer. For example, in the case of two layers such as illustrated in example 700, the code block(s) may initially be mapped sequentially to an RE index of an OFDM symbol in layer 1, then to the next RE index of the same OFDM symbol in layer 1, and so forth in increasing frequency of the REs over the same OFDM symbol in layer 1 until the REs in that symbol are fully mapped. This process may then repeat for other OFDM symbols in layer 1 (excluding DMRS symbols) until the code block(s) in that layer are fully mapped, as indicated by the direction of the arrows in the Layer 1 PDSCH resources of FIG. 7. Afterwards, the aforementioned process may repeat for layer 2. For example, as illustrated in example 700, the code block(s) may be mapped sequentially to an RE index of an OFDM symbol in layer 2, then to the next RE index of the same OFDM symbol in layer 2, and so forth in increasing frequency of the REs over the same OFDM symbol in layer 2 until the REs in that symbol are fully mapped. This process may then repeat for other OFDM symbols in Layer 2 (excluding DMRS symbols) until the code block(s) in layer 2 are fully mapped, as indicated by the direction of the arrows in the Layer 2 PDSCH resources of FIG. 7. In cases of more than two layers, the aforementioned process may repeat for mapping code block(s) sequentially to the other layers, with similar arrow directions as in example 700.

In one example, the mapping may be based on a selection of one of multiple mapping types, and the selection may be based on CSI measurements of uplink data, reported CSI measurements of downlink data, or a mapping recommendation from the UE. For example, referring to FIG. 12, one of multiple mapping types (e.g., FFPL or FF) may be selected to be applied when the code blocks 1210 are mapped to the multiple layers 1212 at block 1216. In one example, the selection may be based on CSI measurements 1222 of uplink data 1224 from the UE 1202. For instance, one of these mapping types may be selected without UE assistance, e.g., based on CSI and channel characteristics which may be measured or estimated from uplink information such as SRS. In another example, the selection may be based on reported CSI measurements 1226 of downlink data previously sent from the base station. For instance, one of these mapping types may be selected partially based on UE-reported measurements or estimations (e.g., CSI) from downlink information such as CSI-RS. In a further example, the selection may be based on a mapping recommendation 1228 from the UE. For instance, one of these mapping types may be selected with UE assistance, e.g., based on a UE recommendation indicating the UE's preferred mapping type (FFPL or FF) for a period of time, rather than from UE-reported measurements or channel estimations.

In one example, the data may be segmented into a number of the code blocks, and the number of the code blocks may be a function of a number of the layers. In one example, the function may be $C=\lceil P*B/P/(K_{cb}-L)\rceil$, where C is the number of the code blocks, P is the number of the layers, B is a number of bits in the data, $K_{cb}$ is a maximum code block size, and L is a number of bits for a CRC sequence. For instance, referring to FIG. 12, at block 1206, a transport block may be segmented into a number of code blocks. For example, referring to FIG. 4, at block 412, transport block 406 (including data 1208 to be sent to UE 402) may be segmented into code blocks 414. The UE 1202 may receive the data 1208 including code blocks 1210 from the base station 1204 in multiple layers 1212, and the number of the code blocks may be a function 1214 of a number of the layers. For instance, during code block segmentation, the function given by Equation (2) above may be applied to segment the code blocks into a number of code blocks C that is perfectly divisible by the number of layers P. For example, if B=258652, $K_{cb}$=8448, L=24, and P=4, then C=32 based on Equation (2) above (rather than C=31 as in Equation (1)), which is perfectly divisible by 4 (32 mod 4=0).

In one example, each of the code blocks may be mapped on one of the layers based on a code block index for the code block and a layer index for the one of the layers. For instance, referring to FIG. 12, at block 1216, the code blocks 1210 may be mapped to the multiple layers 1212 according to FFPL mapping. The FFPL mapping may be performed, for example, during PDSCH processing 428 of FIG. 4, based on a code block index 1218 for each of the code blocks 1210 and a layer index 1220 for each of the layers 1212. For instance, each layer index p, where p=0, . . . , P−1, may be assigned with CBs corresponding to CB indices [p*(C/P), . . . (p+1)*(C/P)−1]. As an example, if P=4 and C=16, then layer 1 (corresponding to index p=0) may be allocated with CBs corresponding to CB indices [0, 1, 2, 3], layer 2 (corresponding to index p=1) with CBs corresponding to CB indices [4, 5, 6, 7], layer 3 (corresponding to index p=2) with CBs corresponding to CB indices [8, 9, 10, 11], and layer 4 (corresponding to index p=3) with CBs corresponding to CB indices [12, 13, 14, 15].

Finally, at 1304, the UE decodes the code blocks based on the mapping. For example, 1304 may be performed by decode component 1542. In one example, the code blocks may be decoded based on the mapping in response to the data being received in a PDSCH. In one example, the code blocks may be decoded after a SIC de-mapping operation. For instance, referring to FIG. 12, at block 1230, the UE may decode the code blocks based on the mapping applied at block 1216. For example, referring to FIG. 4, the UE 402 may layer de-map the data received over channel 430 (e.g., during PDSCH decoding 432) in response to a determination that the association of each layer index 1220 with a corresponding code block index 1218 is such that each code block is exclusive to a single layer (e.g., a determination that the code blocks were mapped according to a FFPL mapping, as illustrated for example in FIGS. 8A and 8B). The UE may perform this layer de-mapping (as well as other PDSCH decoding processes such as demodulation and descrambling) in response to determining that the data is received in a PDSCH (e.g., the data is LDPC-coded). After performing the PDSCH decoding of the received data, the UE may obtain the code blocks from the data (e.g., in response to channel decoding at block 440 and a CRC check at block 440). Thus, the UE may decode the FFPL mapped code blocks. In another example, at block 1232, the UE may perform a SIC de-mapping operation on the data 1208 (e.g., an MMSE-SIC de-mapping operation such as described above with respect to FIG. 9), which may encompass at least the layer de-mapping, channel decoding, and CRC check operations, and the UE may obtain the code blocks 1210 from the data after performing the SIC de-mapping operation.

Figure 14:
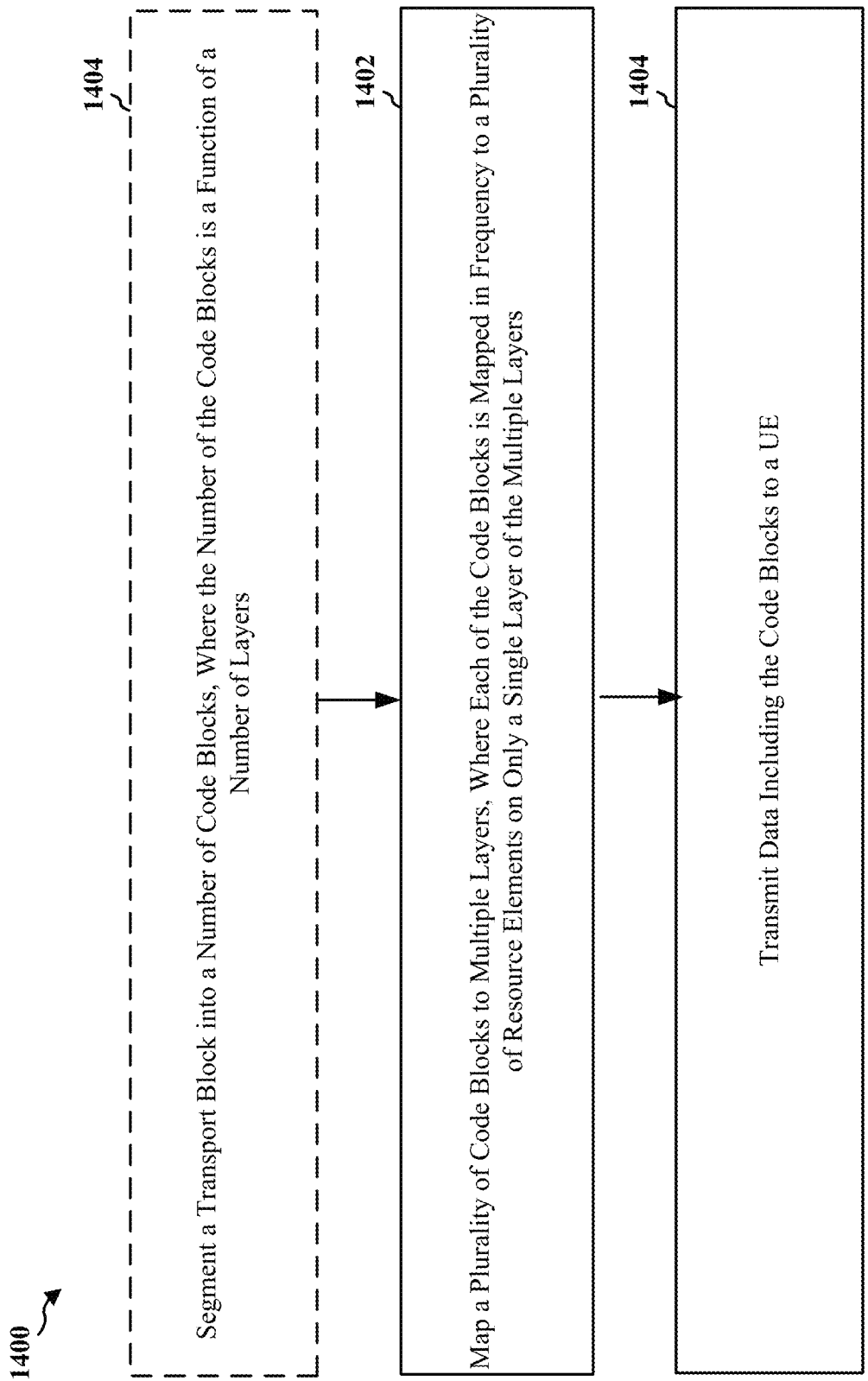
FIG. 14 is a flowchart of a method of wireless communication at a base station.

FIG. 14 is a flowchart 1400 of a method of wireless communication. The method may be performed by a base station (e.g., the base station 102/180, 310, 404, 1204; the apparatus 1602. Optional aspects are illustrated in dashed lines. The method allows a base station to map code blocks according to a FFPL mapping scheme and to transmit FFPL mapped code blocks to a UE.

At 1402, the base station may segment a transport block into a number of code blocks, where the number of the code blocks is a function of a number of layers. For example, 1402 may be performed by segmentation component 1640. In one example, the function may be $C=\lceil P*B/P/(K_{cb}-L)\rceil$, where C is the number of the code blocks, P is the number of the layers, B is a number of bits in the data, $K_{cb}$ is a maximum code block size, and L is a number of bits for a CRC sequence. For instance, referring to FIG. 12, at block 1206, the base station may segment a transport block into a number of code blocks. For example, referring to FIG. 4, at block 412, transport block 406 (including data 1208 to be sent to UE 402) may be segmented into code blocks 414. The base station 1204 may provide the data 1208 including code blocks 1210 to the UE 1202 in multiple layers 1212, and the number of the code blocks may be a function 1214 of a number of the layers. For instance, during code block segmentation, the function given by Equation (2) above may be applied to segment the code blocks into a number of code blocks C that is perfectly divisible by the number of layers P. For example, if B=258652, $K_{cb}$=8448, L=24, and P=4, then C=32 based on Equation (2) above (rather than C=31 as in Equation (1)), which is perfectly divisible by 4 (32 mod 4=0).

At 1404, the base station maps a plurality of code blocks to multiple layers, where each of the code blocks is mapped to a plurality of resource elements initially by frequency and subsequently by time on only a single layer of the multiple layers. For example, 1404 may be performed by map component 1642. In one example, each of the code blocks may be mapped on one of the layers based on a code block index for the code block and a layer index for the one of the layers. For instance, referring to FIG. 12, at block 1216, the base station 1204 may map the code blocks 1210 to the multiple layers 1212 according to FFPL mapping. The base station may perform the FFPL mapping, for example, during PDSCH processing 428 of FIG. 4, based on a code block index 1218 for each of the code blocks 1210 and a layer index 1220 for each of the layers 1212. For instance, the base station may assign each layer index p, where p=0, . . . , P−1 with CBs corresponding to CB indices [p*(C/P), . . . (p+1)*(C/P)−1]. As an example, if P=4 and C=16, then layer 1 (corresponding to index p=0) may be allocated with CBs corresponding to CB indices [0, 1, 2, 3], layer 2 (corresponding to index p=1) with CBs corresponding to CB indices [4, 5, 6, 7], layer 3 (corresponding to index p=2) with CBs corresponding to CB indices [8, 9, 10, 11], and layer 4 (corresponding to index p=3) with CBs corresponding to CB indices [12, 13, 14, 15]. After mapping the modulation symbols of each code block index to layer indices, the base station may apply the layer-mapped, modulation symbols to the REs frequency first for each layer. For instance, referring to FIGS. 7, 8A, and 8B, the base station may map modulated symbols of each of the code blocks 1210, sequentially in each of the layers 1212, to contiguous RE indices 702, 802, 852 along the frequency domain from a lowest RE index to a highest RE index (or vice-versa), for each of the OFDM symbols 704, 804, 854, code block after code block, and layer after layer. That is, the base station may map code blocks to REs in order of frequency followed by time followed by layer, resulting in each of the code blocks 1210 being mapped to only one of the layers 1212 such as illustrated in the examples of FIGS. 8A and 8B.

In one example, each of the layers may include a same number of the code blocks. For example, referring to FIGS. 7, 8A, and 8B, the data portion corresponding to each layer (e.g. the REs assigned to code block(s) in each layer) may be mapped to the same number of REs (or RBs) and CBs on each layer. For instance, with reference to FIG. 7, the number of CBs mapped to Layer 1 PDSCH resources may be the same as the number of CBs mapped to Layer 2 PDSCH resources, and the number of REs (or RBs) mapped to CB(s) in Layer 1 PDSCH resources may be the same as the number of REs (or RBs) mapped to CB(s) in Layer 2 PDSCH resources. For example, as illustrated in example 800 of FIG. 8A, three CBs (CBs 0, 1, and 2) may each be mapped to 2400 REs in Layer 1, and three CBs (CBs 3, 4, and 5) may each be mapped to 2400 REs in Layer 2. Similarly, as illustrated in example 850 of FIG. 8B, four CBs (CBs 0, 1, 2, and 3) may each be mapped to 2000 REs in Layer 1 (here, CB 3's mapping to REs in symbol 8 is not shown), and four CBs (CBs 4, 5, 6, and 7) may each be mapped to 2000 REs in Layer 2 (here, CB 7's mapping to REs in symbol 8 is similarly not shown).

In one example, the code blocks in corresponding symbols of the layers may be mapped to same resource element indices in all of the layers. For example, referring to FIGS. 7, 8A, and 8B, the boundaries between the REs (or RBs) assigned to CBs in each layer may be the same between layers (e.g., the layer 1 and layer 2 plots in FIGS. 8A and 8B mirror each other with respect to RE and CB boundaries). For instance, as illustrated in example 800 of FIG. 8A, CB 0 may occupy the same REs (e.g., RE indices 802) in symbols 1 and 2 of Layer 1 as CB 3 in symbols 1 and 2 of Layer 2, CB 1 may occupy the same REs (e.g., RE indices 802) in symbols 4 and 5 of Layer 1 as CB 4 in symbols 4 and 5 of Layer 2, and CB 2 may occupy the same REs (e.g., RE indices 802) in symbols 6 and 7 of Layer 1 as CB 5 in symbols 6 and 7 of Layer 2. Similarly, as illustrated in example 850 of FIG. 8B, CBs 0 and 1 may occupy the same REs (e.g., RE indices 852) in symbols 1 and 2 of Layer 2 as CBs 4 and 5 in symbols 1 and 2 of Layer 2, CBs 0, 1 and 2 may occupy the same REs (e.g., RE indices 802) in symbols 2, 4 and 5 of Layer 1 as CBs 4, 5 and 6 in symbols 2, 4 and 5 of Layer 2, and CBs 1, 2 and 3 may occupy the same REs (e.g., RE indices 802) in symbols 5, 6 and 7 of Layer 1 as CBs 5, 6, and 7 in symbols 5, 6 and 7 of Layer 2.

In one example, the code blocks may be mapped to the resource elements in one of the layers before the code blocks in another one of the layers are mapped. For example, referring to FIG. 7, the modulated symbols of one or more code blocks may be mapped to RE indices 702 of an OFDM symbol 704 in a sequential manner for each layer. For example, in the case of two layers such as illustrated in example 700, the code block(s) may initially be mapped sequentially to an RE index of an OFDM symbol in layer 1, then to the next RE index of the same OFDM symbol in layer 1, and so forth in increasing frequency of the REs over the same OFDM symbol in layer 1 until the REs in that symbol are fully mapped. This process may then repeat for other OFDM symbols in layer 1 (excluding DMRS symbols) until the code block(s) in that layer are fully mapped, as indicated by the direction of the arrows in the Layer 1 PDSCH resources of FIG. 7. Afterwards, the aforementioned process may repeat for layer 2. For example, as illustrated in example 700, the code block(s) may be mapped sequentially to an RE index of an OFDM symbol in layer 2, then to the next RE index of the same OFDM symbol in layer 2, and so forth in increasing frequency of the REs over the same OFDM symbol in layer 2 until the REs in that symbol are fully mapped. This process may then repeat for other OFDM symbols in Layer 2 (excluding DMRS symbols) until the code block(s) in layer 2 are fully mapped, as indicated by the direction of the arrows in the Layer 2 PDSCH resources of FIG. 7. In cases of more than two layers, the aforementioned process may repeat for mapping code block(s) sequentially to the other layers, with similar arrow directions as in example 700.

In one example, the mapping may be based on a selection of one of multiple mapping types, and the selection may be based on CSI measurements of uplink data, reported CSI measurements of downlink data, or a mapping recommendation from the UE. For example, referring to FIG. 12, one of multiple mapping types (e.g., FFPL or FF) may be selected to be applied when the code blocks 1210 are mapped to the multiple layers 1212 at block 1216. In one example, the selection may be based on CSI measurements 1222 of uplink data 1224 from the UE 1202. For instance, one of these mapping types may be selected without UE assistance, e.g., based on CSI and channel characteristics which may be measured or estimated from uplink information such as SRS. In another example, the selection may be based on reported CSI measurements 1226 of downlink data previously sent from the base station. For instance, one of these mapping types may be selected partially based on UE-reported measurements or estimations (e.g., CSI) from downlink information such as CSI-RS. In a further example, the selection may be based on a mapping recommendation 1228 from the UE. For instance, one of these mapping types may be selected with UE assistance, e.g., based on a UE recommendation indicating the UE's preferred mapping type (FFPL or FF) for a period of time, rather than from UE-reported measurements or channel estimations.

Finally, at 1406, the base station transmits data including the code blocks to a UE. For example, 1406 may be performed by code block transmission component 1644. In one example, the data may be transmitted in a PDSCH. For instance, referring to FIG. 12, the base station 1204 may transmit data 1208 including the code blocks 1210 to UE 1202 over multiple layers 1212 in PDSCH.

Figure 15:
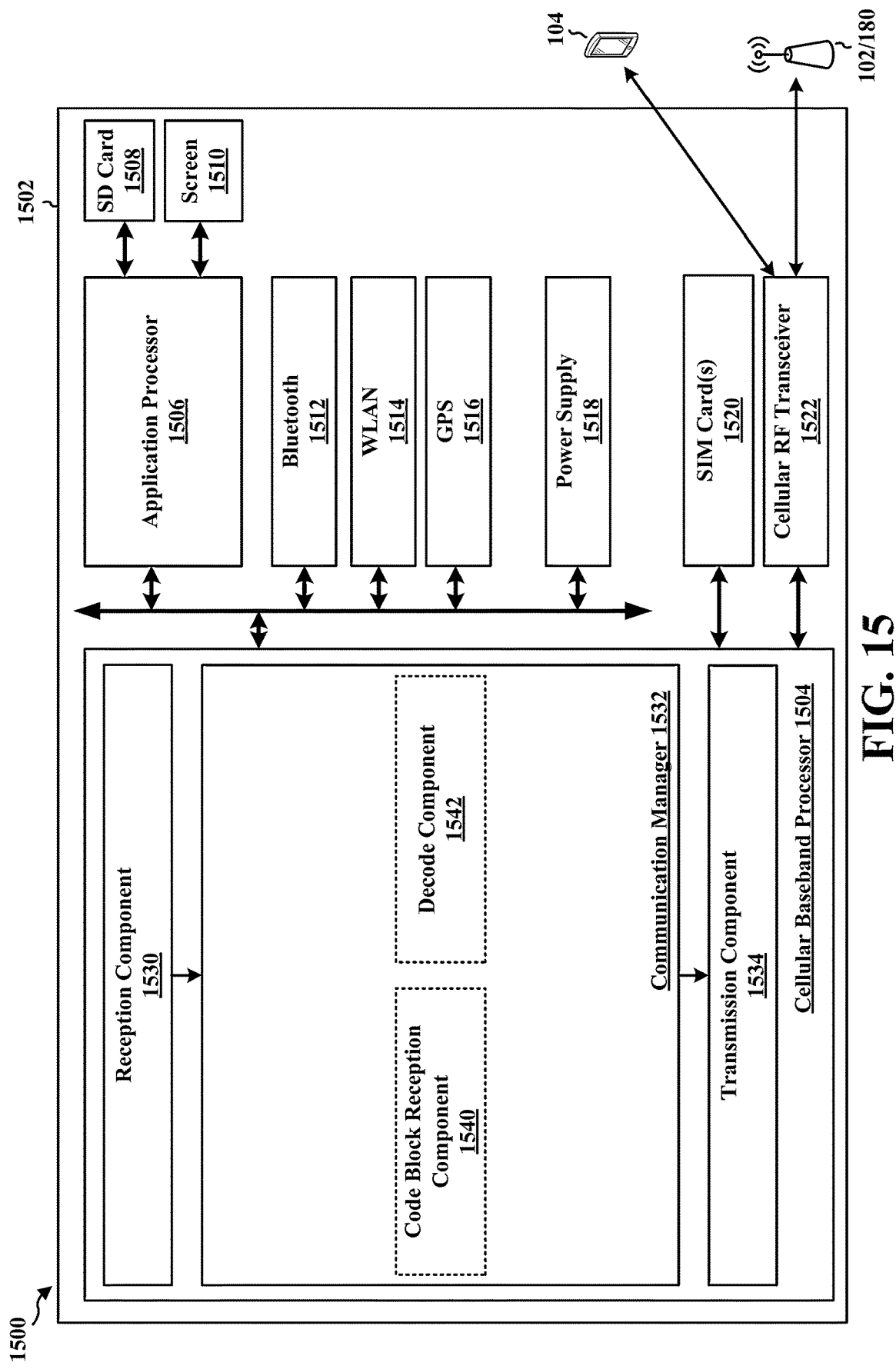
FIG. 15 is a diagram illustrating an example of a hardware implementation for an example apparatus.

FIG. 15 is a diagram 1500 illustrating an example of a hardware implementation for an apparatus 1502. The apparatus 1502 is a UE and includes a cellular baseband processor 1504 (also referred to as a modem) coupled to a cellular RF transceiver 1522 and one or more subscriber identity modules (SIM) cards 1520, an application processor 1506 coupled to a secure digital (SD) card 1508 and a screen 1510, a Bluetooth module 1512, a wireless local area network (WLAN) module 1514, a Global Positioning System (GPS) module 1516, and a power supply 1518. The cellular baseband processor 1504 communicates through the cellular RF transceiver 1522 with the UE 104 and/or BS 102/180. The cellular baseband processor 1504 may include a computer-readable medium/memory. The computer-readable medium/memory may be non-transitory. The cellular baseband processor 1504 is responsible for general processing, including the execution of software stored on the computer-readable medium/memory. The software, when executed by the cellular baseband processor 1504, causes the cellular baseband processor 1504 to perform the various functions described supra. The computer-readable medium/memory may also be used for storing data that is manipulated by the cellular baseband processor 1504 when executing software. The cellular baseband processor 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the cellular baseband processor 1504. The cellular baseband processor 1504 may be a component of the UE 350 and may include the memory 360 and/or at least one of the TX processor 368, the RX processor 356, and the controller/processor 359. In one configuration, the apparatus 1502 may be a modem chip and include just the baseband processor 1504, and in another configuration, the apparatus 1502 may be the entire UE (e.g., see 350 of FIG. 3) and include the aforediscussed additional modules of the apparatus 1502.

The communication manager 1532 includes a code block reception component 1540 that is configured to receive data in multiple layers from a base station, the data including a plurality of code blocks, where each of the code blocks is mapped to a plurality of resource elements initially by frequency and subsequently by time on only a single layer of the multiple layers, e.g., as described in connection with 1302. The communication manager 1532 further includes a decode component 1542 that receives input in the form of the code blocks from the code block reception component 1540 and is configured to decode the code blocks based on the mapping, e.g., as described in connection with 1304.

The apparatus may include additional components that perform each of the blocks of the algorithm in the aforementioned flowcharts of FIGS. 12 and 13. As such, each block in the aforementioned flowcharts of FIGS. 12 and 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1502, and in particular the cellular baseband processor 1504, includes means for receiving data in multiple layers from a base station, the data including a plurality of code blocks, wherein each of the code blocks is mapped to a plurality of resource elements initially by frequency and subsequently by time on only a single layer of the multiple layers; and means for decoding the code blocks based on the mapping.

The aforementioned means may be one or more of the aforementioned components of the apparatus 1502 configured to perform the functions recited by the aforementioned means. As described supra, the apparatus 1502 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 16:
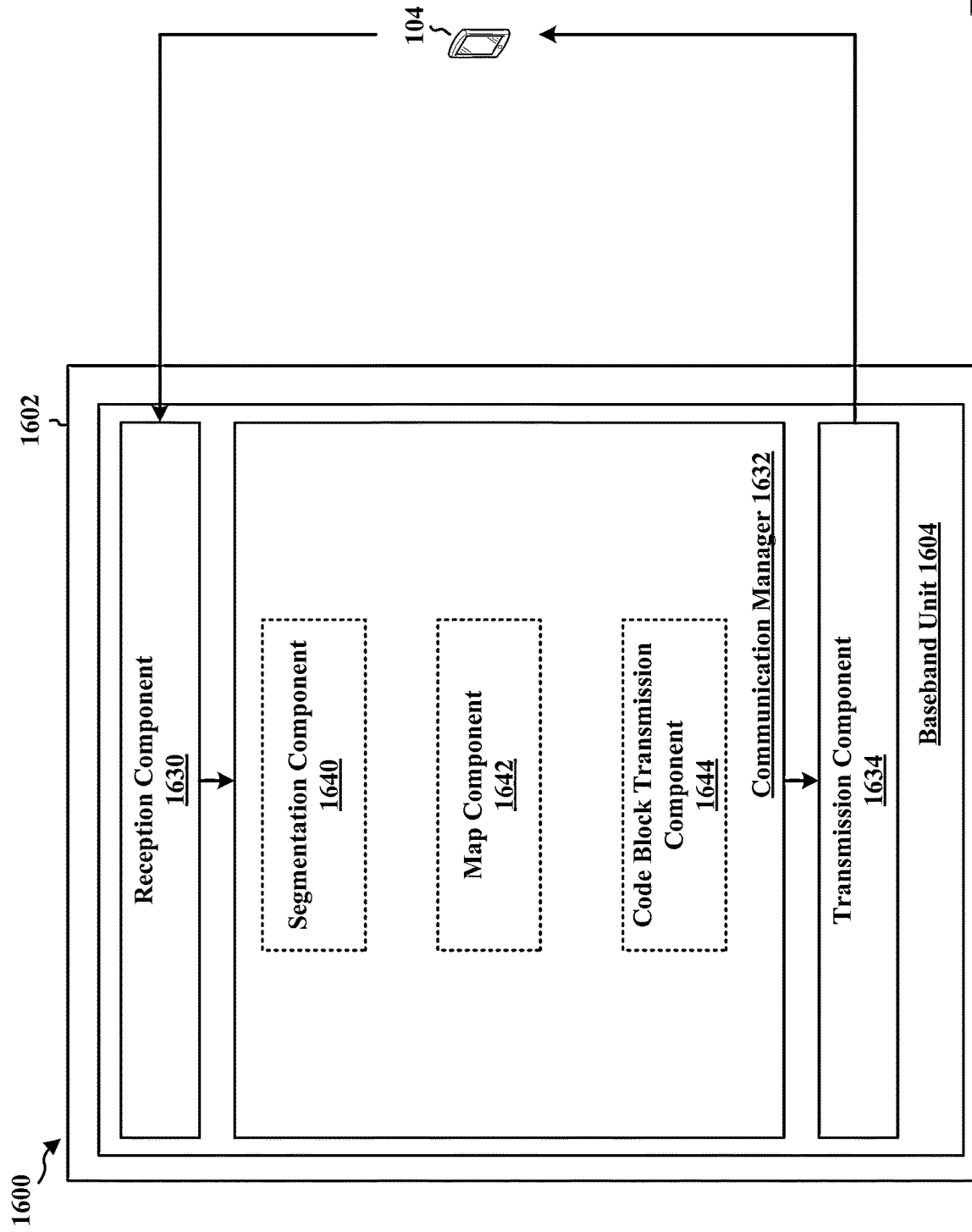
FIG. 16 is a diagram illustrating another example of a hardware implementation for another example apparatus.

FIG. 16 is a diagram 1600 illustrating an example of a hardware implementation for an apparatus 1602. The apparatus 1602 is a BS and includes a baseband unit 1604. The baseband unit 1604 may communicate through a cellular RF transceiver with the UE 104. The baseband unit 1604 may include a computer-readable medium/memory. The baseband unit 1604 is responsible for general processing, including the execution of software stored on the computer-readable medium/memory. The software, when executed by the baseband unit 1604, causes the baseband unit 1604 to perform the various functions described supra. The computer-readable medium/memory may also be used for storing data that is manipulated by the baseband unit 1604 when executing software. The baseband unit 1604 further includes a reception component 1630, a communication manager 1632, and a transmission component 1634. The communication manager 1632 includes the one or more illustrated components. The components within the communication manager 1632 may be stored in the computer-readable medium/memory and/or configured as hardware within the baseband unit 1604. The baseband unit 1604 may be a component of the BS 310 and may include the memory 376 and/or at least one of the TX processor 316, the RX processor 370, and the controller/processor 375.

The communication manager 1632 includes a segmentation component 1640 that is configured to segment a transport block into a number of code blocks, where the number of the code blocks is a function of a number of layers, e.g., as described in connection with 1402. The communication manager 1632 further includes a map component 1642 that receives input in the form of the code blocks from the segmentation component 1640 and is configured to map a plurality of the code blocks to multiple layers, where each of the code blocks is mapped to a plurality of resource elements initially by frequency and subsequently by time on only a single layer of the multiple layers, e.g., as described in connection with 1404. The communication manager 1632 further includes a code block transmission component 1644 that receives input in the form of the code blocks from the map component 1642 and is configured to transmit data including the code blocks to a UE, e.g., as described in connection with 1406.

The apparatus may include additional components that perform each of the blocks of the algorithm in the aforementioned flowcharts of FIGS. 12 and 14. As such, each block in the aforementioned flowcharts of FIGS. 12 and 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1602, and in particular the baseband unit 1604, includes means for mapping a plurality of code blocks to multiple layers, wherein each of the code blocks is mapped to a plurality of resource elements initially by frequency and subsequently by time on only a single layer of the multiple layers; and means for transmitting data including the code blocks to a user equipment (UE). In one configuration, the apparatus 1602, and in particular the baseband unit 1604, may include means for segmenting a transport block into a number of the code blocks, wherein the number of the code blocks is a function of a number of the layers.

The aforementioned means may be one or more of the aforementioned components of the apparatus 1602 configured to perform the functions recited by the aforementioned means. As described supra, the apparatus 1602 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following examples are illustrative only and may be combined with aspects of other embodiments or teachings described herein, without limitation.

Example 1 is a method of wireless communication at a user equipment (UE), comprising: receiving data in multiple layers from a base station, the data including a plurality of code blocks, wherein each of the code blocks is mapped to a plurality of resource elements initially by frequency and subsequently by time on only a single layer of the multiple layers; and decoding the code blocks based on the mapping.

Example 2 is the method of Example 1, wherein each of the layers includes a same number of the code blocks.

Example 3 is the method of Examples 1 or 2, wherein the code blocks in corresponding symbols of the layers are mapped to same resource element indices in all of the layers.

Example 4 is the method of any of Examples 1 to 3, wherein the code blocks are mapped to the resource elements in one of the layers before the code blocks in another one of the layers are mapped.

Example 5 is the method of any of Examples 1 to 4, wherein the code blocks are decoded based on the mapping in response to the data being received in a physical downlink shared channel (PDSCH).

Example 6 is the method of any of Examples 1 to 5, wherein the mapping is based on a selection of one of multiple mapping types, and the selection is based on channel state information (CSI) measurements of uplink data, reported CSI measurements of downlink data, or a mapping recommendation from the UE.

Example 7 is the method of any of Examples 1 to 6, wherein the data is segmented into a number of the code blocks, and the number of the code blocks is a function of a number of the layers.

Example 8 is the method of Example 7, wherein the function is $C=[P*B/P/(K_{cb}-L)]$, wherein C is the number of the code blocks, P is the number of the layers, B is a number of bits in the data, $K_{cb}$ is a maximum code block size, and L is a number of bits for a cyclic redundancy check (CRC) sequence.

Example 9 is the method of any of Examples 1 to 8, wherein each of the code blocks is mapped on one of the layers based on a code block index for the code block and a layer index for the one of the layers.

Example 10 is the method of any of Examples 1 to 9, wherein the code blocks are decoded after a successive interference cancellation (SIC) de-mapping operation.

Example 11 is an apparatus for wireless communication, comprising: a processor; memory coupled with the processor; and instructions stored in the memory and operable, when executed by the processor, to cause the apparatus to: receive data in multiple layers from a base station, the data including a plurality of code blocks, wherein each of the code blocks is mapped to a plurality of resource elements initially by frequency and subsequently by time on only a single layer of the multiple layers; and decode the code blocks based on the mapping.

Example 12 is the apparatus of Example 11, wherein each of the layers includes a same number of the code blocks.

Example 13 is the apparatus of Examples 11 or 12, wherein the code blocks in corresponding symbols of the layers are mapped to same resource element indices in all of the layers.

Example 14 is the apparatus of any of Examples 11 to 13, wherein the code blocks are mapped to the resource elements in one of the layers before the code blocks in another one of the layers are mapped.

Example 15 is the apparatus of any of Examples 11 to 14, wherein the code blocks are decoded based on the mapping in response to the data being received in a physical downlink shared channel (PDSCH).

Example 16 is the apparatus of any of Examples 11 to 15, wherein the code blocks are decoded after a successive interference cancellation (SIC) de-mapping operation.

Example 17 is a method of wireless communication at a base station, comprising: mapping a plurality of code blocks to multiple layers, wherein each of the code blocks is mapped to a plurality of resource elements initially by frequency and subsequently by time on only a single layer of the multiple layers; and transmitting data including the code blocks to a user equipment (UE).

Example 18 is the method of Example 17, wherein each of the layers includes a same number of the code blocks.

Example 19 is the method of Examples 17 or 18, wherein the code blocks in corresponding symbols of the layers are mapped to same resource element indices in all of the layers.

Example 20 is the method of any of Examples 17 to 19, wherein the code blocks are mapped to the resource elements in one of the layers before the code blocks in another one of the layers are mapped.

Example 21 is the method of any of Examples 17 to 20, wherein the data is transmitted in a physical downlink shared channel (PDSCH).

Example 22 is the method of any of Examples 17 to 21, wherein the mapping is based on a selection of one of multiple mapping types, and the selection is based on channel state information (CSI) measurements of uplink data, reported CSI measurements of downlink data, or a mapping recommendation from the UE.

Example 23 is the method of any of Examples 17 to 22, further comprising: segmenting a transport block into a number of the code blocks, wherein the number of the code blocks is a function of a number of the layers.

Example 24 is the method of Example 23, wherein the function is $C=[P*B/P/(K_{cb}-L)]$, wherein C is the number of the code blocks, P is the number of the layers, B is a number of bits in the data, $K_{cb}$ is a maximum code block size, and L is a number of bits for a cyclic redundancy check (CRC) sequence.

Example 25 is the method of any of Examples 17 to 24, wherein each of the code blocks is mapped on one of the layers based on a code block index for the code block and a layer index for the one of the layers.

Example 26 is an apparatus for wireless communication, comprising: a processor; memory coupled with the processor; and instructions stored in the memory and operable, when executed by the processor, to cause the apparatus to: map a plurality of code blocks to multiple layers, wherein each of the code blocks is mapped to a plurality of resource elements initially by frequency and subsequently by time on only a single layer of the multiple layers; and transmit data including the code blocks to a user equipment (UE).

Example 27 is the apparatus of Example 26, wherein the mapping is based on a selection of one of multiple mapping types, and the selection is based on channel state information (CSI) measurements of uplink data, reported CSI measurements of downlink data, or a mapping recommendation from the UE.

Example 28 is the apparatus of Examples 26 or 27, wherein the instructions, when executed by the processor, further cause the apparatus to: segment a transport block into a number of the code blocks, wherein the number of the code blocks is a function of a number of the layers.

Example 29 is the apparatus of Example 28, wherein the function is $C=[P*B/P/(K_{cb}-L)]$, wherein C is the number of the code blocks, P is the number of the layers, B is a number of bits in the data, $K_{cb}$ is a maximum code block size, and L is a number of bits for a cyclic redundancy check (CRC) sequence.

Example 30 is the apparatus of any of Examples 26 to 29, wherein each of the code blocks is mapped on one of the layers based on a code block index for the code block and a layer index for the one of the layers.

What is claimed is:

1. A method of wireless communication at a user equipment (UE), comprising:
    receiving data in multiple layers from a base station, the data including a plurality of code blocks, wherein the code blocks are mapped to a plurality of resource elements according to a frequency first per layer (FFPL) mapping based on a selection of one of multiple mapping types including the FFPL mapping, the selection being based on channel state information (CSI) measurements of uplink data, reported CSI measurements of downlink data, or a mapping recommendation from the UE, wherein in the FFPL mapping a respective one of the code blocks is mapped to contiguous resource elements of the plurality of resource elements initially by frequency and subsequently by time on only a single layer of the multiple layers; and
    decoding the code blocks based on the FFPL mapping.

2. The method of claim 1, wherein each of the layers includes a same number of the code blocks.

3. The method of claim 1, wherein the code blocks in corresponding symbols of the layers are mapped to same resource element indices in all of the layers.

4. The method of claim 1, wherein the code blocks are mapped to the resource elements in one of the layers before the code blocks in another one of the layers are mapped.

5. The method of claim 1, wherein the code blocks are decoded based on the mapping in response to the data being received in a physical downlink shared channel (PDSCH).

6. The method of claim 1, wherein the data is segmented into a number of the code blocks, and the number of the code blocks is a function of a number of the layers.

7. The method of claim 6, wherein the function is $C=\lceil P*B/P/(K_{cb}-L)\rceil$, wherein C is the number of the code blocks, P is the number of the layers, B is a number of bits in the data, $K_{cb}$ is a maximum code block size, and L is a number of bits for a cyclic redundancy check (CRC) sequence.

8. The method of claim 1, wherein each of the code blocks is mapped on one of the layers based on a code block index for the code block and a layer index for the one of the layers.

9. The method of claim 1, wherein the code blocks are decoded after a successive interference cancellation (SIC) de-mapping operation.

10. An apparatus for wireless communication, comprising:
one or more processors;
one or more memories each coupled with at least one of the one or more processors; and
instructions stored in the one or more memories, individually or in combination, and operable, when executed by the one or more processors, individually or in combination, to cause the apparatus to:
receive data in multiple layers from a base station, the data including a plurality of code blocks, wherein the code blocks are mapped to a plurality of resource elements according to a frequency first per layer (FFPL) mapping based on a selection of one of multiple mapping types including the FFPL mapping, the selection being based on channel state information (CSI) measurements of uplink data, reported CSI measurements of downlink data, or a mapping recommendation from the apparatus, wherein in the FFPL mapping a respective one of the code blocks is mapped to contiguous resource elements of the plurality of resource elements initially by frequency and subsequently by time on only a single layer of the multiple layers; and
decode the code blocks based on the FFPL mapping.

11. The apparatus of claim 10, wherein each of the layers includes a same number of the code blocks.

12. The apparatus of claim 10, wherein the code blocks in corresponding symbols of the layers are mapped to same resource element indices in all of the layers.

13. The apparatus of claim 11, wherein the code blocks are mapped to the resource elements in one of the layers before the code blocks in another one of the layers are mapped.

14. The apparatus of claim 10, wherein the code blocks are decoded based on the mapping in response to the data being received in a physical downlink shared channel (PDSCH).

15. The apparatus of claim 10, wherein the code blocks are decoded after a successive interference cancellation (SIC) de-mapping operation.

16. A method of wireless communication at a base station, comprising:
mapping a plurality of code blocks to multiple layers, wherein the code blocks are mapped to a plurality of resource elements according to a frequency first per layer (FFPL) mapping based on a selection of one of multiple mapping types including the FFPL mapping, the selection being based on channel state information (CSI) measurements of uplink data, reported CSI measurements of downlink data, or a mapping recommendation from a user equipment (UE), wherein in the FFPL mapping a respective one of the code blocks is mapped to contiguous resource elements of the plurality of resource elements initially by frequency and subsequently by time on only a single layer of the multiple layers; and
transmitting data including the code blocks to the UE.

17. The method of claim 16, wherein each of the layers includes a same number of the code blocks.

18. The method of claim 16, wherein the code blocks in corresponding symbols of the layers are mapped to same resource element indices in all of the layers.

19. The method of claim 16, wherein the code blocks are mapped to the resource elements in one of the layers before the code blocks in another one of the layers are mapped.

20. The method of claim 16, wherein the data is transmitted in a physical downlink shared channel (PDSCH).

21. The method of claim 16, further comprising:
segmenting a transport block into a number of the code blocks, wherein the number of the code blocks is a function of a number of the layers.

22. The method of claim 21, wherein the function is $C=\lceil P*B/P/(K_{cb}-L)\rceil$, wherein C is the number of the code blocks, P is the number of the layers, B is a number of bits in the data, $K_{cb}$ is a maximum code block size, and L is a number of bits for a cyclic redundancy check (CRC) sequence.

23. The method of claim 16, wherein each of the code blocks is mapped on one of the layers based on a code block index for the code block and a layer index for the one of the layers.

24. An apparatus for wireless communication, comprising:
one or more processors;
one or more memories each coupled with at least one of the one or more processors; and
instructions stored in the one or more memories, individually or in combination, and operable, when executed by the one or more processors, individually or in combination, to cause the apparatus to:
map a plurality of code blocks to multiple layers, wherein the code blocks are mapped to a plurality of resource elements according to a frequency first per layer (FFPL) mapping based on a selection of one of multiple mapping types including the FFPL mapping, the selection being based on channel state information (CSI) measurements of uplink data, reported CSI measurements of downlink data, or a mapping recommendation from a user equipment (UE), wherein in the FFPL mapping a respective one of the code blocks is mapped to contiguous resource elements of the plurality of resource elements initially by frequency and subsequently by time on only a single layer of the multiple layers; and
transmit data including the code blocks to the UE.

25. The apparatus of claim 24, wherein the instructions, when executed by the one or more processors, individually or in combination, further cause the apparatus to:
segment a transport block into a number of the code blocks, wherein the number of the code blocks is a function of a number of the layers.

26. The apparatus of claim 25, wherein the function is $C=\lceil P*B/P/(K_{cb}-L)\rceil$, wherein C is the number of the code blocks, P is the number of the layers, B is a number of bits in the data, $K_{cb}$ is a maximum code block size, and L is a number of bits for a cyclic redundancy check (CRC) sequence.

27. The apparatus of claim 24, wherein each of the code blocks is mapped on one of the layers based on a code block index for the code block and a layer index for the one of the layers.

* * * * *